United States Patent
Tsuchiya et al.

(10) Patent No.: US 8,240,047 B2
(45) Date of Patent: Aug. 14, 2012

(54) ASSEMBLING METHOD FOR METAL HONEYCOMB-SHAPED CATALYZER CARRIER AND ASSEMBLING APPARATUS FOR THE SAME

(75) Inventors: Takashi Tsuchiya, Tochigi (JP); Tadashi Goto, Tochigi (JP); Nobuyuki Kakiya, Tochigi (JP); Chiyoko Nemoto, Tochigi (JP); Toshiyuki Horimukai, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 1082 days.

(21) Appl. No.: 11/993,164

(22) PCT Filed: Jun. 21, 2006

(86) PCT No.: PCT/JP2006/312445
§ 371 (c)(1),
(2), (4) Date: Dec. 19, 2007

(87) PCT Pub. No.: WO2006/137456
PCT Pub. Date: Dec. 28, 2006

(65) Prior Publication Data
US 2010/0064496 A1     Mar. 18, 2010

(30) Foreign Application Priority Data

Jun. 21, 2005   (JP) ................................. 2005-181235
Jun. 21, 2005   (JP) ................................. 2005-181256

(51) Int. Cl.
*B21D 51/16*     (2006.01)
(52) U.S. Cl. .......................................... 29/890; 29/505
(58) Field of Classification Search .................. 29/890, 29/505
See application file for complete search history.

(56) References Cited

U.S. PATENT DOCUMENTS

| 5,302,355 A | * | 4/1994 | Fujikura et al. | ............... 422/180 |
| 5,336,472 A | * | 8/1994 | Toyoda et al. | ............... 422/177 |
| 5,402,928 A | * | 4/1995 | Preston et al. | ............... 228/181 |

(Continued)

FOREIGN PATENT DOCUMENTS

JP     31-93335     8/1991

(Continued)

*Primary Examiner* — David Bryant
*Assistant Examiner* — Jacob Cigna
(74) *Attorney, Agent, or Firm* — Rankin, Hill & Clark LLP

(57) ABSTRACT

A method for assembling a metal honeycomb catalyzer carrier includes the steps of winding corrugated belt plate materials into a substantially cylindrical shape, forming a wound structure into a predetermined cylindrical shape with a die 101 and pushing out a wound honeycomb body 12 obtained through the forming from the die and inserting the wound honeycomb body 12 into the interior of a tubular member 13. An assembling apparatus 31 includes a winding unit 42 which includes, in turn, a rotational holding shaft 167 and a press roller unit 38, a die unit 39 for forming a wound structure wound round the rotational holding shaft 167 into a wound honeycomb body 12 of a predetermined cylindrical shape (of an outside diameter Dp), a tube support unit 132 for setting a tubular member 13 at an edge of a die surface 126, and a honeycomb push-out and insertion unit 34 for pushing out a formed structure from a die 101 and inserting the formed structure so pushed out into the tubular member 13.

11 Claims, 35 Drawing Sheets

U.S. PATENT DOCUMENTS

| | | | | |
|---|---|---|---|---|
| 5,532,453 A | * | 7/1996 | Sheller | 219/127 |
| 5,557,847 A | * | 9/1996 | Koshiba et al. | 29/890 |
| 5,852,274 A | * | 12/1998 | Watanabe et al. | 219/117.1 |
| 6,049,961 A | * | 4/2000 | Wieres | 29/505 |
| 6,115,906 A | * | 9/2000 | Wieres | 29/505 |
| 6,226,867 B1 | * | 5/2001 | Bruck et al. | 29/890 |
| 6,311,395 B1 | * | 11/2001 | Wieres | 29/890 |
| 6,505,396 B1 | * | 1/2003 | Wieres | 29/700 |
| 6,807,723 B2 | * | 10/2004 | Park et al. | 29/709 |
| 7,947,624 B2 | * | 5/2011 | Tsuchiya et al. | 502/439 |

FOREIGN PATENT DOCUMENTS

| | | | | |
|---|---|---|---|---|
| JP | 5-70644 | | | 9/1993 |
| JP | 7-194985 | | | 8/1995 |
| JP | 07194985 | A | * | 8/1995 |
| JP | 8-257361 | | | 10/1996 |
| JP | 2571879 | | | 10/1996 |
| JP | 11-197518 | | | 7/1999 |
| JP | 11197518 | A | * | 7/1999 |
| JP | 11253814 | A | * | 9/1999 |

* cited by examiner

ASSEMBLING METHOD FOR METAL HONEYCOMB-SHAPED CATALYZER CARRIER AND ASSEMBLING APPARATUS FOR THE SAME

TECHNICAL FIELD

The present invention relates to an assembling method for a cylindrical metal honeycomb catalyzer carrier which holds catalyzer for use in cleaning exhaust gases.

BACKGROUND ART

As a method for manufacturing a cylindrical honeycomb body, there exists a method for winding a long foil from an end thereof while supporting a resulting wound structure with three rollers (for example, refer to Patent Document No. 1).

In addition, as an apparatus for manufacturing a honeycomb body, there exists an apparatus for winding a long foil and inserting a resulting wound structure into a tubular casing (for example, Patent Document No. 2).

Patent Document No. 1: Japanese Patent Unexamined Publication JP-A-8-257361 (Page 5, FIG. 1)

Patent Document No. 2: Japanese Patent Examined Publication No. JP-B-2571879 (Page 4, FIG. 2)

Patent Document No. 1 will be described based on the following drawings.

FIG. 34 is an explanatory diagram which illustrates a conventional technique (Patent Document No. 1). In a conventional honeycomb body winding method, three rollers 302, 302, 302 are disposed in a circumferential direction of an outer circumferential surface of a honeycomb body 301, so that a flat foil 303 is wound into a honeycomb body 301 with a backward tension applied thereto by a brake roller 304, while the resulting wound honeycomb body 301 is maintained pressed by the rollers 302, 302, 302 which are adapted to move to narrow a space therebetween. As this occurs, since a pressing force applied by each of the rollers 302 is detected by a potentiometer 305 so as to adjust the pressing force so applied, in the event that thickness of the foil is thin, a slack in the foil can be eliminated.

FIGS. 35A to 35E are explanatory diagrams which illustrate a conventional technique (Patent Document No. 2). In a honeycomb body press fitting apparatus, a honeycomb body 321 is set in a honeycomb body gripping claw 322, a tubular casing 323 is placed on a tubular casing resting plate 324, the tubular casing resting plate 324 is raised by a tubular casing elevating cylinder 325 so as to be fitted in divided press-fit guides 326, 327, the press-fit guides 326, 327 are raised as shown by an arrow y1, and the honeycomb body 321 is placed in the press-fit guides 326, 327 by opening the honeycomb griping claw 322. A press-fit cylinder 328 is then activated so as to push the honeycomb body 321 into the tubular casing 323 as indicated by an arrow y2, and the honeycomb body 321 is pushed in further by opening the press-fit guides 326, 327 as indicated by an arrow y3.

In the honeycomb body winding method of Patent Document No. 1 (refer to FIG. 34), while the honeycomb body 301 is designed to be inserted into a casing while the honeycomb body 301 is wound to a predetermined diameter, as this occurs, the honeycomb body 301 is inserted into the casing with difficulty.

In the honeycomb body press-fit apparatus of Patent Document No. 2 (refer to FIG. 35), the honeycomb body 321 needs to be set in the honeycomb body griping claw 322, and hence, some labor hours are necessary to set the honeycomb body 321 in that way.

DISCLOSURE OF THE INVENTION

Problem that the Invention is to Solve

The invention was made in view of the situations and an object thereof is to provide a method and apparatus for assembling a metal honeycomb catalyzer carrier which can facilitate the insertion of a wound honeycomb body into a tubular member and which needs few labor hours in inserting the wound honeycomb body into the tubular member.

Means for Solving the Problem

According to a first aspect of the invention, there is provided an assembling method for a metal honeycomb-shaped catalyzer carrier comprising a honeycomb body comprising a belt plate having a corrugated portion provided in at least part thereof in a longitudinal direction; and a longitudinal central portion, the method comprising the steps of:

holding the central portion of the belt plate in a widthways direction of the belt plate by a holding member;

abutting the belt plate with the holding member so as to bend the belt plate; and rotating the holding member about its rotational center so as to wind the belt plate; and pressing the wound belt plate towards the rotational center of the holding member from outside so as to form the wound belt plate into a substantially cylindrical shape.

According to a second aspect of the invention, there is provided an apparatus for assembling a metal honeycomb catalyzer carrier having a honeycomb body comprising a belt plate having a corrugated portion provided in at least part thereof in a longitudinal direction; and a longitudinal central portion, the apparatus comprising:

a rotational holding shaft disposed in such a manner that its rotational axis is directed to be parallel to a widthways direction of the belt plate, adapted to hold the central portion of the belt plate and capable of rotating about the rotational axis thereof;

bending means comprising a rectilinear bending die which is disposed parallel to the rotational axis of the rotational holding shaft for sliding the bending die so as to bend the belt plate at a position where the rotational holding shaft which supports the belt plate is situated; and press roller means for causing the belt plate to approach the rotational holding shaft to a predetermined position and pressing the belt plate being wound from outside towards the rotational axis.

According to a third aspect of the invention, there is provided an assembling method for a metal honeycomb catalyzer carrier comprising: a honeycomb body comprising a belt plate having a corrugated portion provided in at least part thereof in a longitudinal direction; and a longitudinal central portion; and a tubular member for accommodating the belt plate in a wound state, the method comprising the steps of:

winding the belt plate by holding the central portion of the belt plate by a holding member and rotating the holding member about its rotational axis and at the same time pressing the wound belt plate towards the rotational center from outside so as to form the wound belt plate so wound into a substantially cylindrical shape, so as to obtain a primary wound structure; forming the primary wound structure into the honeycomb body of a cylindrical shape having a predetermined outside diameter in a die; and pushing out the honeycomb body and inserting the honeycomb body so pushed out into the tubular member which is connected to the die.

According to a fourth aspect of the invention, there is provided an apparatus for assembling a metal honeycomb catalyzer carrier having a honeycomb body comprising a belt plate having a corrugated portion provided in at least part thereof in a longitudinal direction; and a longitudinal central portion, and a tubular member for accommodating the belt plate in a wound state, the apparatus comprising:

a winding unit having a rotational holding shaft disposed in such a manner that its rotational axis is directed to be parallel to a widthways direction of the belt plate, adapted to hold the central portion of the belt plate and capable of rotating about the rotational axis thereof and a press roller unit for causing the belt plate to approach a predetermined position and pressing the wound belt plate from outside;

a die unit having a pair of semi-circular die surfaces which move in an opposite direction to each other so as to fasten and release the wound belt plate so as to form the wound belt plate into a honeycomb body having a predetermined cylindrical shape;

a tube supporting unit for supporting concentrically with the rotational axis the tubular member having an inside diameter which is larger than an inside diameter produced by the pair of semi-circular die surfaces at an end portion of the pair of semi-circular die surfaces; and a honeycomb push-out unit for pushing out a honeycomb body obtained by the die unit into the tubular member.

Advantages of the Invention

According to the first aspect of the invention, there is provided an advantage that a bending radius at the start of winding or a start-winding bending radius can be reduced by bending the belt plate while bringing the belt plate into abutment with the holding member.

According to the second aspect of the invention, the belt plate (a corrugated belt plate material) is brought into contact with the holding member by the bending unit, whereby the start-winding bending radius is reduced. Consequently, there are provided advantages that the start-winding bending radius can be reduced and that too many labor hours are not necessary to reduce the start-winding bending radius.

According to the third aspect of the invention, there is no need to remount the wound honeycomb body on, for example, a device for inserting the same structure into the tubular member, and hence, there is provided an advantage that the inserting work of the wound honeycomb body into the tubular member is facilitated.

According to the fourth aspect of the invention, the primary wound structure in which the belt plate is wound into the predetermined cylindrical shape can be obtained at the stage where the belt plate is so wound round a tubular portion, and the primary wound structure can be inserted directly into the tubular member at the stage where the belt plate is wound around the tubular portion into the primary wound structure. Consequently, there is provided an advantage that too many labor hours are not necessary to insert the wound honeycomb body into the tubular member.

DESCRIPTION OF REFERENCE NUMERALS AND CHARACTERS

11: metal honeycomb catalyzer carrier;
12: wound honeycomb body;
13: tubular member;
23: belt plate (corrugated belt plate material);
24: corrugated portion;
26: central portion of belt plate;
31: metal honeycomb catalyzer carrier assembling apparatus;
34: honeycomb push-out and insertion unit;
38: press roller unit;
39: die unit;
42: winding unit; 101: die; 126: die surface;
127: positioning chamfered portion formed along an edge;
132: tube supporting unit; 167: rotational holding shaft;
191: primary wound structure; Dm: diameter of die surface;
M: rotational axis center.
Best Mode for Carrying out the Invention A best mode for carrying out the invention will be described below based on the accompanying drawings.

Figure 1A:
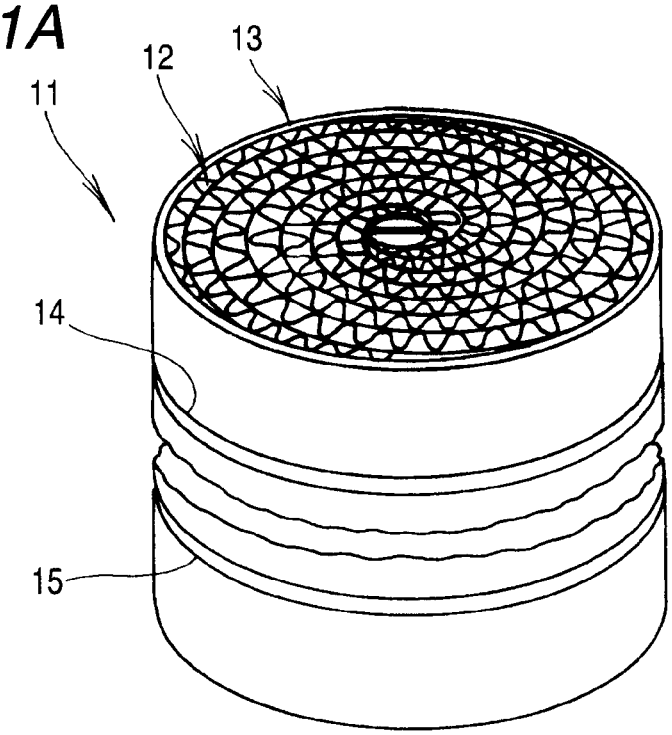
[FIG. 1A] An explanatory diagram of a metal honeycomb catalyzer carrier which is to be manufactured by a metal honeycomb catalyzer carrier assembling method of the invention.
Figure 1B:
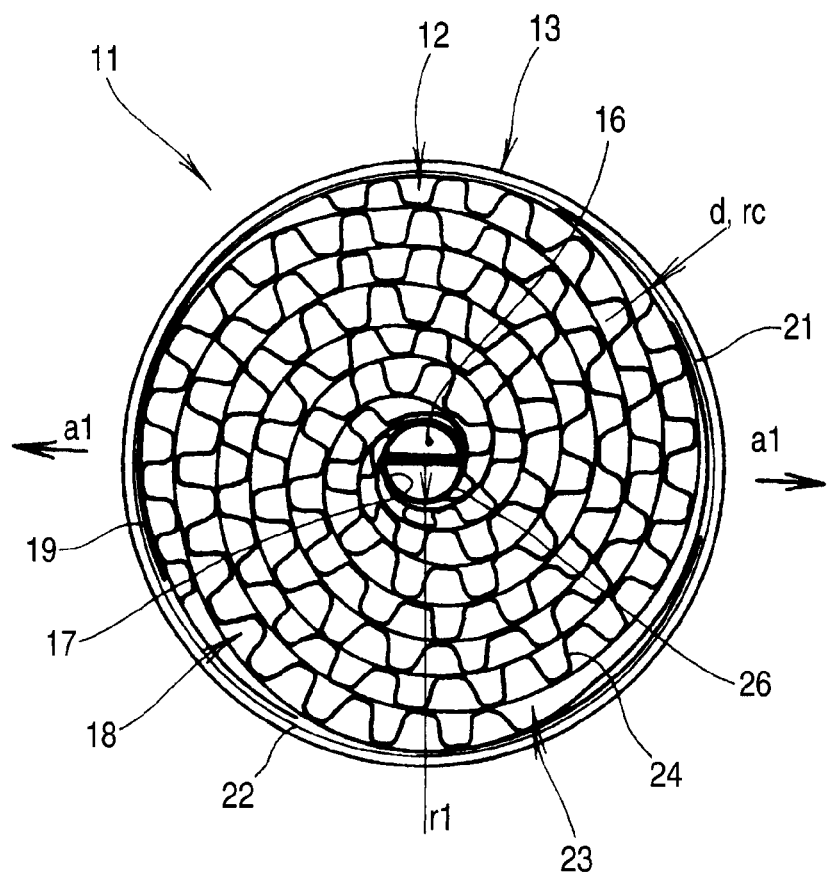
[FIG. 1B] An explanatory diagram of the metal honeycomb catalyzer carrier which is to be manufactured by the metal honeycomb catalyzer carrier assembling method of the invention.

FIGS. 1A, 1B are explanatory diagrams of a metal honeycomb catalyzer carrier which is manufactured by a metal honeycomb catalyzer carrier assembling method of the invention. FIG. 1B is a plan view.

A metal honeycomb catalyzer carrier 11 is made up of a wound honeycomb body 12, a tubular member 13 which covers the wound honeycomb body 12, and weld portions 14, 15 which fix the wound honeycomb body 12 to the tubular member 13.

The wound honeycomb body 12 has a honeycomb-like cross section and is formed as will be described below. A tubular portion 17 is formed in a position which will be a central portion 16 of a wound honeycomb body 12 which will be formed later on, a honeycomb portion 18 is formed to stretch continuously from the tubular portion 17 in a radially outward direction (in a direction indicated by arrows a1, a1), winding terminal ends 19, 21 (refer to FIG. 16) are formed continuously and radially outwards of the honeycomb portion 18, and the winding terminal ends 19, 21 are integrally fixed to an inner surface 22 of the tubular member 13 at the weld portions 14, 15. Reference numeral 23 denotes a corrugated belt plate material which is a material of a belt plate, 24 (refer to FIG. 16, as well) a corrugated portion of the corrugated belt plate material 23, 25 (refer to FIG. 16, as well) a flat portion and 26 (refer to FIG. 16, as well) a central portion of the corrugated belt plate material 23.

A bending radius at the start of winding or a start-winding bending radius of the wound honeycomb body 12 is set to r1 (a mean value). This start-winding bending radius r1 is a radius which results when the corrugated belt plate material 23 is brought into contact with a rotational holding shaft 167 (refer to FIG. 15) in a radiused fashion. The tubular member 13 is a metallic tube, and its inside diameter is set to d (a radius rc).

Next, a metal honeycomb catalyzer carrier assembling apparatus of the invention will be described which is used in manufacturing the metal honeycomb catalyzer carrier 11 configured as has been described above.

Figure 2:
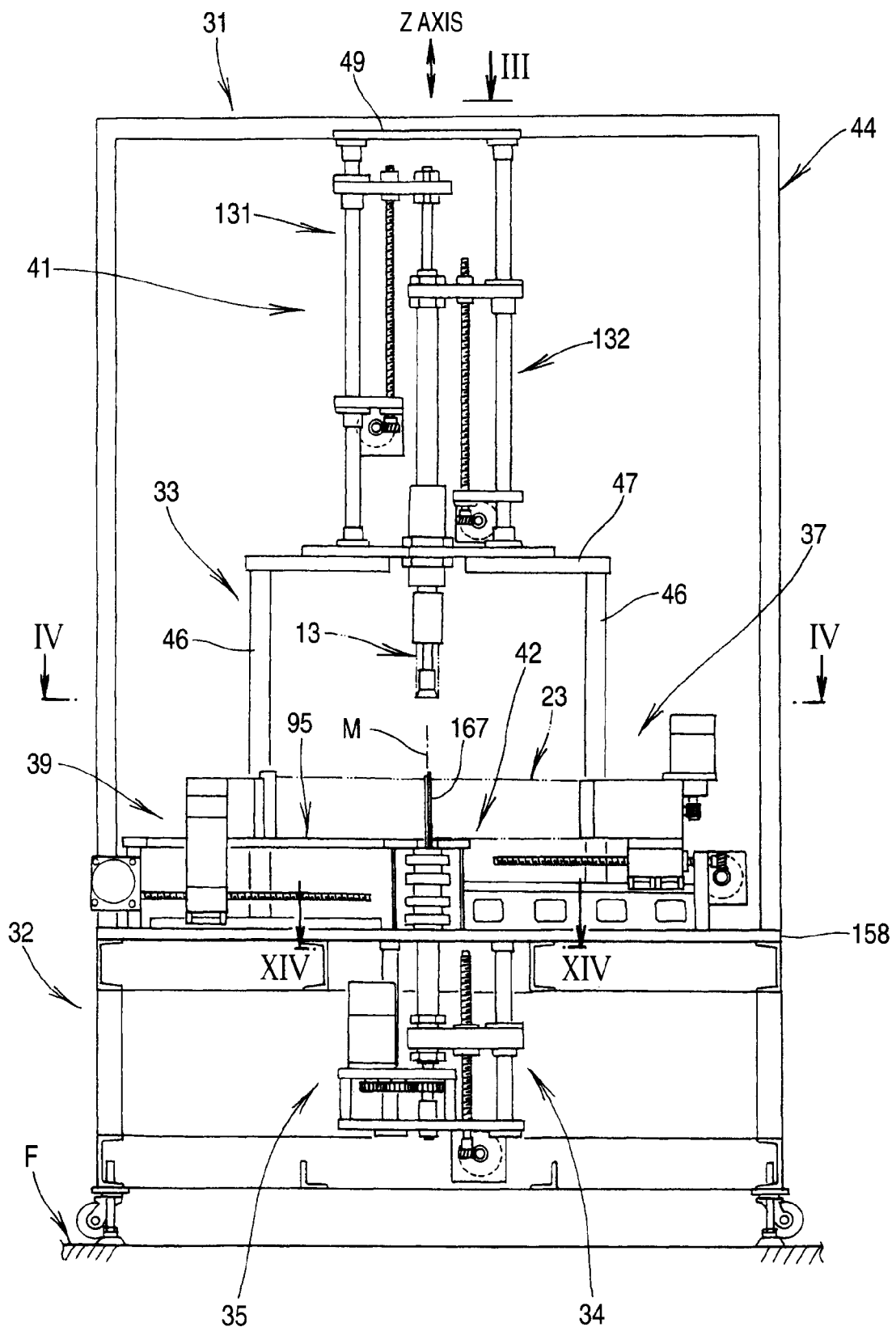
[FIG. 2] A front view of a metal honeycomb catalyzer carrier assembling apparatus of the invention.

FIG. 2 is a front view of a metal honeycomb catalyzer carrier assembling apparatus of the invention.

A metal honeycomb catalyzer carrier assembling apparatus 31 includes a first-stage base 32 that is placed on a floor, a second-stage base 33 disposed on the first-stage base 32, a honeycomb push-out and insertion unit 34 and a winding rotational unit 35 which are mounted on the first-stage base 32, a first bending unit 36 (refer to FIG. 4), a second bending unit 37 (refer to FIG. 4), a press roller unit 38 and a die unit 39 which are placed on the first-stage base 32, a work presser unit 41 which is placed on the second-stage base 33, a control unit (not shown) for controlling these units 34 to 39, 41, a control panel (not shown), and a pneumatic device (not shown). Reference character M denotes a rotational axis center of the metal honeycomb catalyzer carrier assembling apparatus 31.

In addition, the winding rotational unit 35 and the press roller unit 38 (refer to FIG. 4) which are disposed on the first-stage base 32 make up a winding unit 42.

Figure 3:
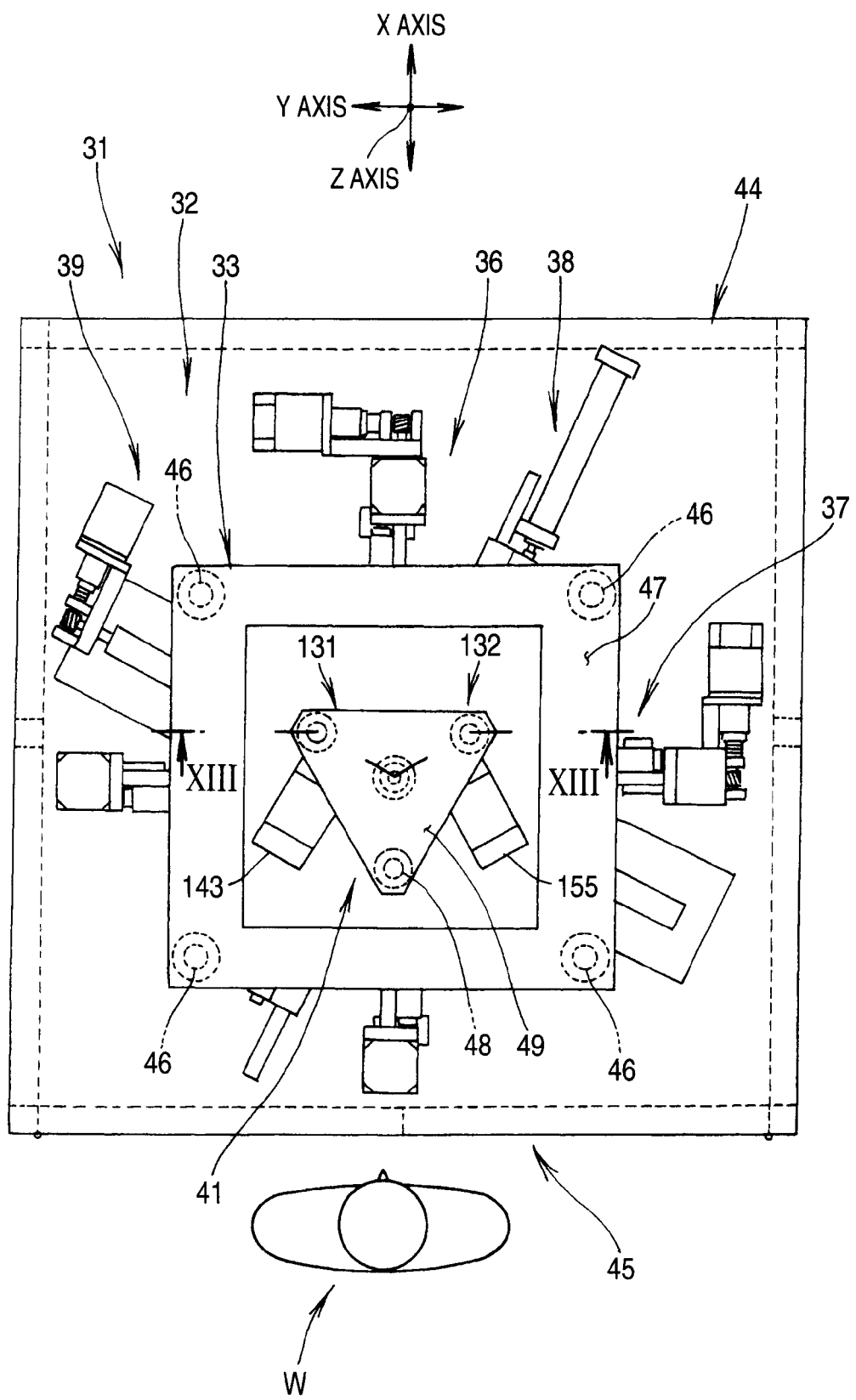
[FIG. 3] A view resulting when the assembling apparatus is seen in a direction indicated by an arrow III in FIG. 2.

FIG. 3 is a view resulting when the metal honeycomb catalyzer carrier assembling apparatus 31 is seen in a direction indicated by an arrow III in FIG. 2 and shows a plan view of the same assembling apparatus. Axes shown on the figure indicates directions in which the assembling apparatus 31 moves rectilinearly or rotationally, and X denotes an axis indicating a horizontal rectilinear movement, Y denotes an axis which intersects X at right angles, and Z denotes a perpendicular axis which intersects X and Y at right angles. Note that a rotational holding shaft, which will be described later on, turns about the Z axis.

In addition, in the metal honeycomb catalyzer carrier assembling apparatus 31, a fence portion 44 and an opening and closing door 45 are mounted on the first-stage base 32, the second-stage base 33 is made up of four pillars 46 . . . standing up on the first-stage base 32 and a plate member 47 mounted on the pillars 46 . . . , and the work presser unit 41 is placed integrally on the second-stage base 33, and the metal honeycomb catalyzer carrier assembling apparatus 31 is operated by a worker W who stands on the opening and closing door 45 side. Reference numeral 48 denotes a pillar for the work presser unit 41 and 49 a connecting top plate which connects to the pillar 48.

The worker W stands on the opening and closing door 45 side, feeds four corrugated belt plate materials 23 (refer to FIG. 16) . . . , and removes a metal honeycomb catalyzer carrier 11 (refer to FIG. 1) which has not yet been welded after the metal honeycomb catalyzer carrier assembling apparatus 31 is operated one cycle.

Figure 4:
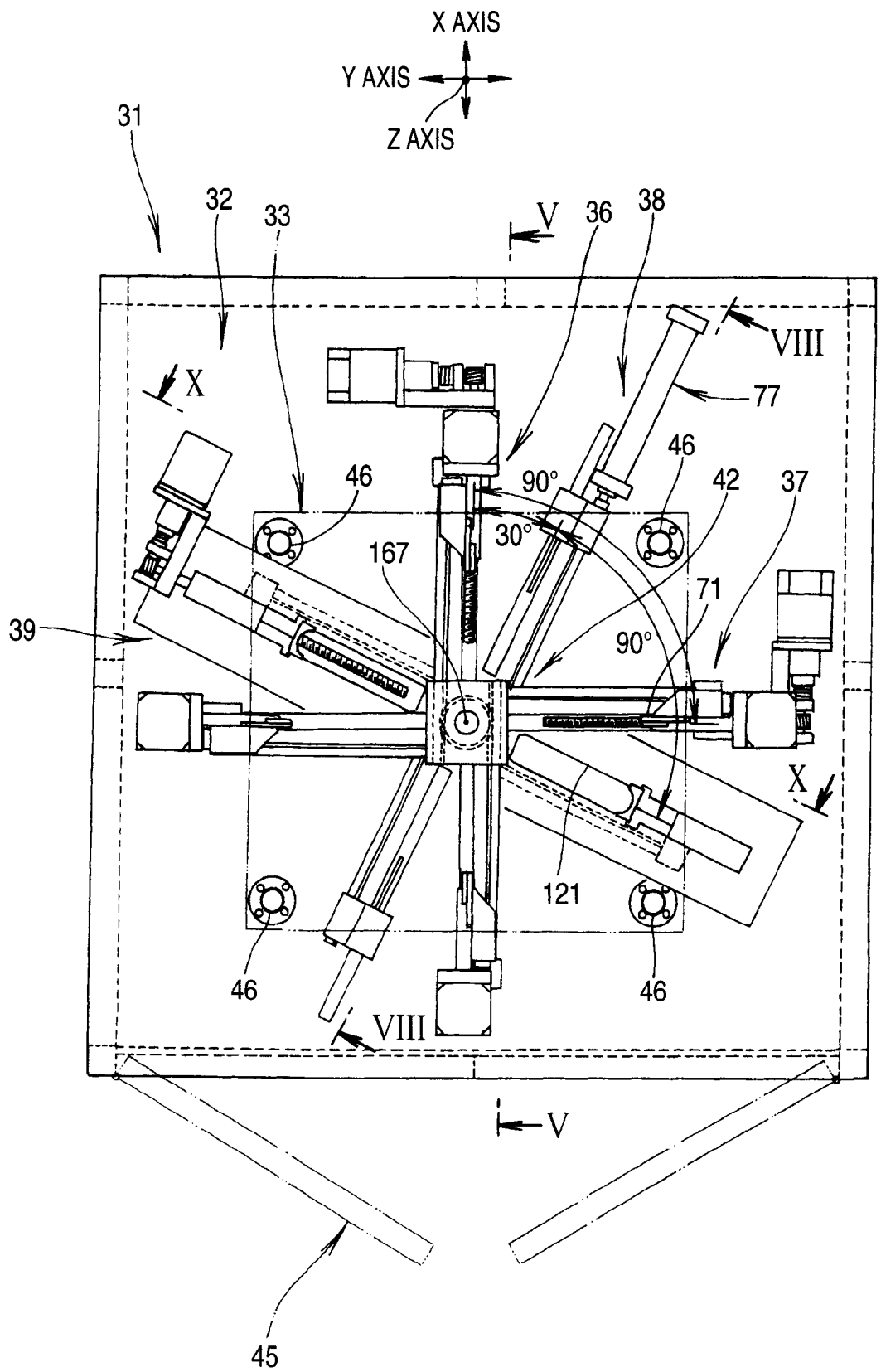
[FIG. 4] A sectional view taken along the line IV-IV in FIG. 2.

FIG. 4 is a sectional view taken along the line IV-IV in FIG. 2. The description continues, referring to FIGS. 2, 3, as well.

Furthermore, in the metal honeycomb catalyzer carrier 31, centers of the units 34 to 39, 41 are made to coincide with each other at the rotational axis center M, the first bending unit 36 is disposed in a direction of the X axis, the second bending unit 37 is disposed at a position lying 90° apart from the first bending unit 36, the pressure roller unit 38 is disposed at a position lying 30° apart from the X axis, and the die unit 39 is disposed at a position lying 90° apart from the pressure roller unit 38.

Figure 5:
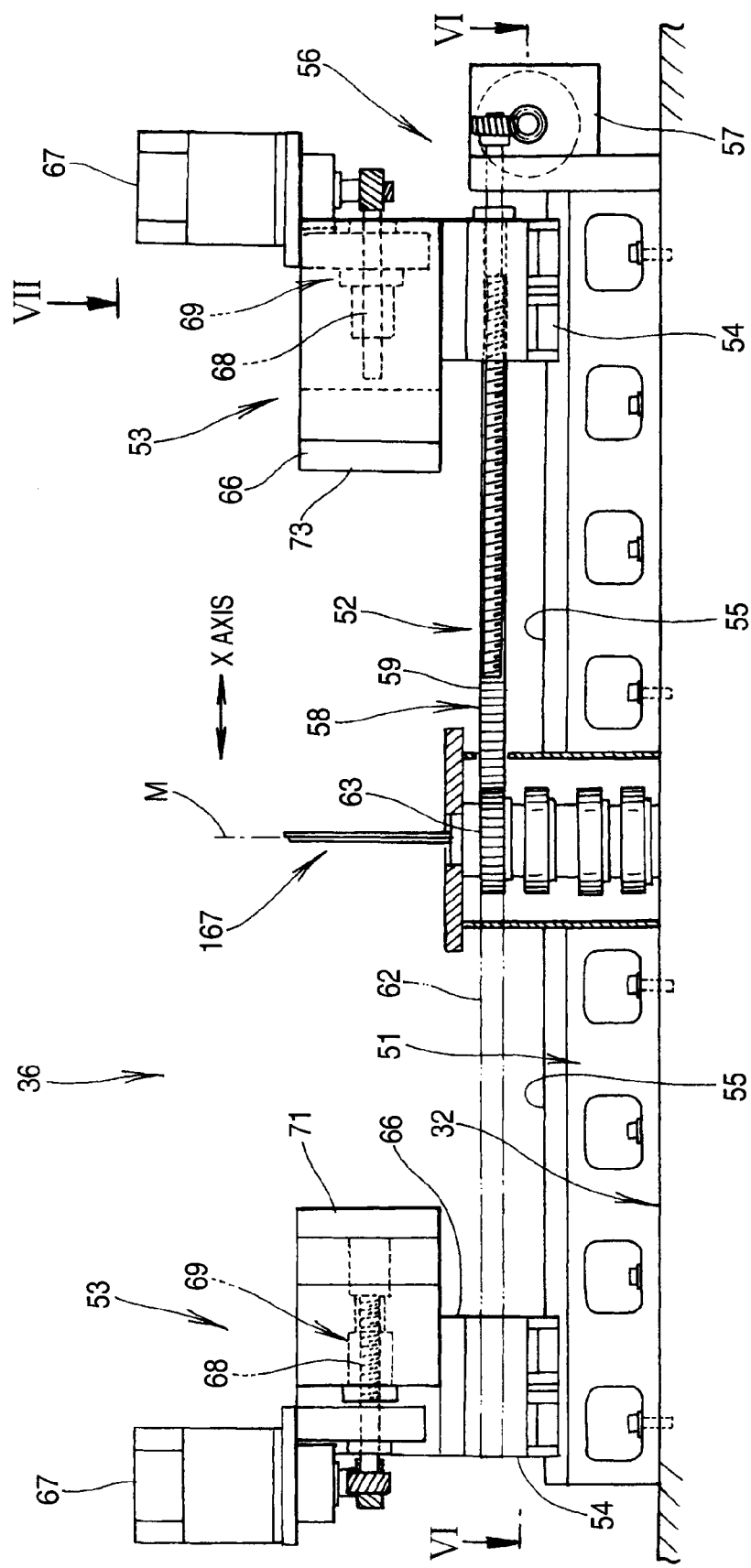
[FIG. 5] A view resulting when the assembling apparatus is seen in a direction indicated by an arrow V in FIG. 4.

FIG. 5 is a view resulting when the metal honeycomb catalyzer carrier assembling apparatus 31 is viewed in a direction indicated by arrows V in FIG. 4 and shows the front (partly including sections) of the first bending unit 36 and a waiting state at an origin position.

Figure 6:
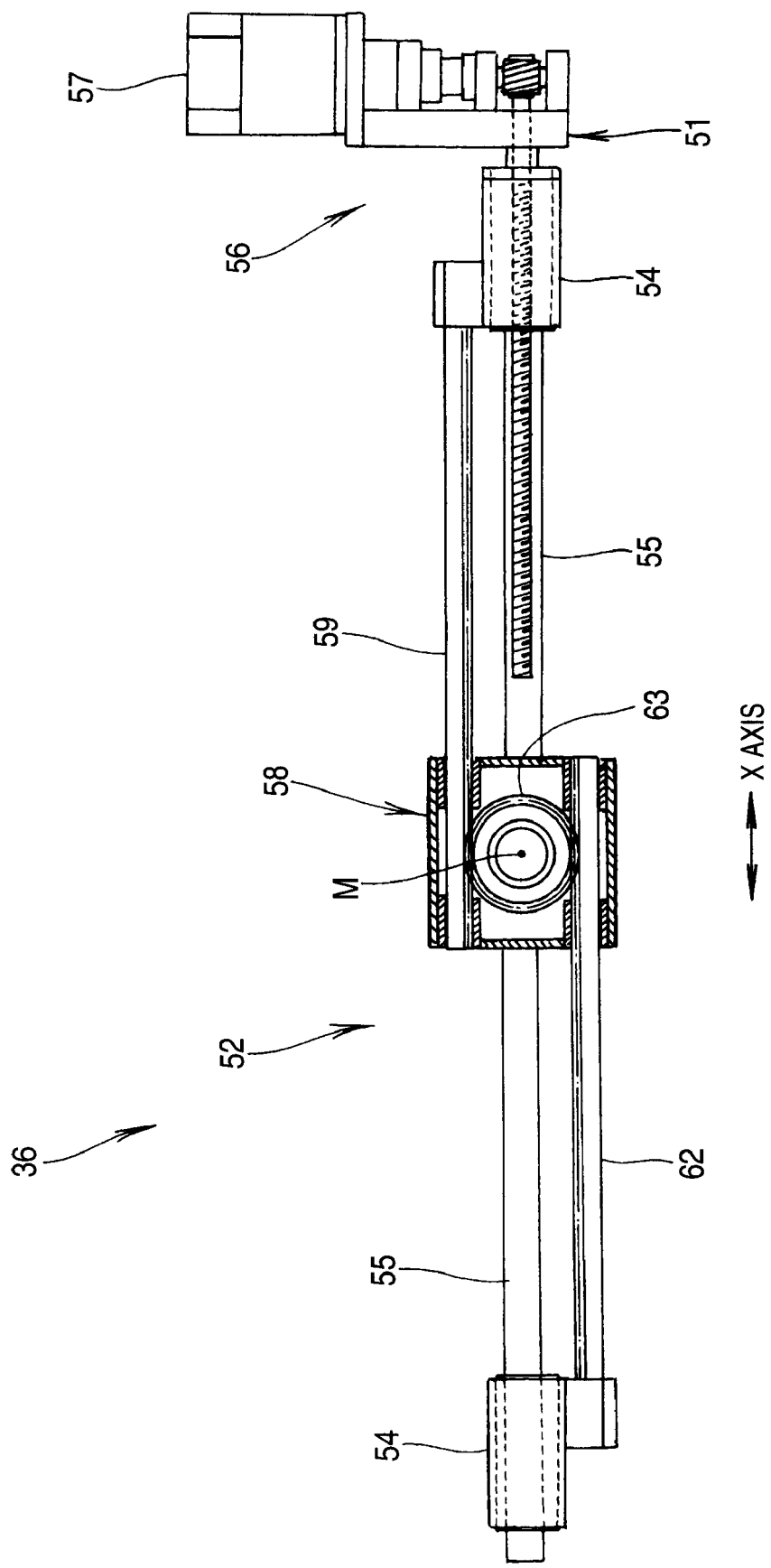
[FIG. 6] A sectional view taken along the line VI-VI in FIG. 5.

FIG. 6 is a sectional view taken along the line VI-VI in FIG. 5.

The first bending unit 36 is such that a base table 51 is mounted on the first-stage base 32, a driving unit 52 is disposed on the base table 51, and bending units 53, 53 are mounted on the driving unit 52.

In the driving unit 52, sliding rails 55, 55 each equipped with a slider 54 are mounted on the base table 51, a ball screw mechanism 56 is connected to one (lying on the right-hand side of the figure) of the sliders 54, and an electric motor 57 is coupled to the ball screw mechanism 56. Furthermore, the electric motor 57 is fixed to the base table 51, a first synchronous unit 58 is disposed on the first-stage base 32, the ball screw mechanism 56 is connected to a first rack 59 of the first synchronous unit 58, and a second rack 62 of the first synchronous unit 58 is connected to the other (lying on a left-hand side of the figure) of the sliders 54, whereby the sliders are caused to slide (in the X axis direction) in such a state that the bending units 53, 53 are synchronized. Reference numeral 63 denotes a first pinion which engages with the first and second racks 59, 62 of the first synchronous unit 58.

Figure 7A:
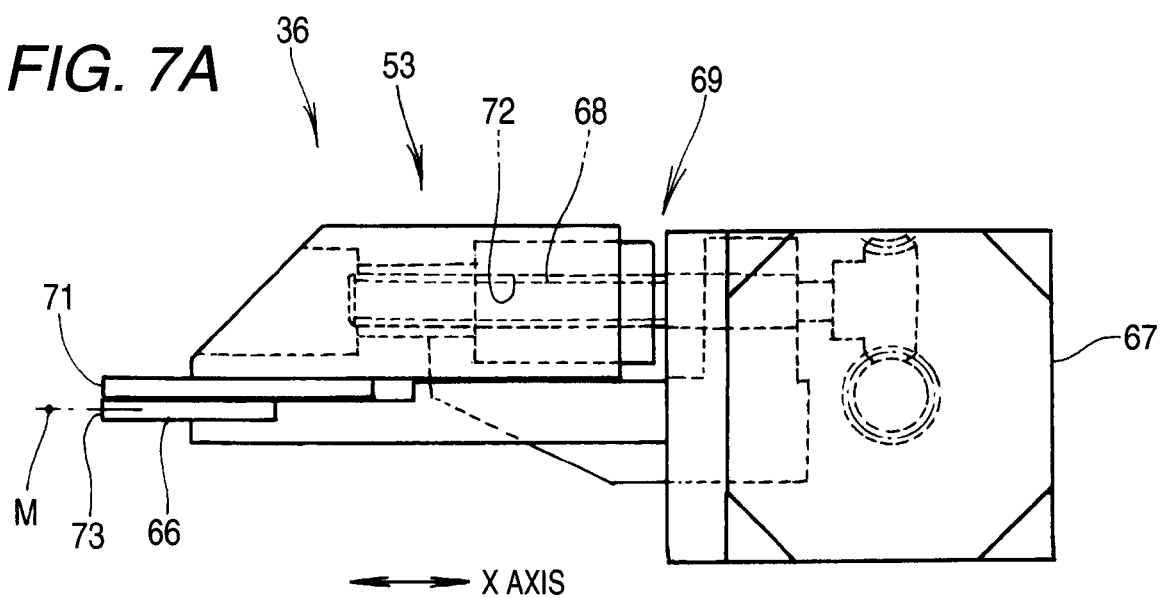
[FIG. 7A] An explanatory diagram of a bending unit equipped on a first bending unit.
Figure 7B:
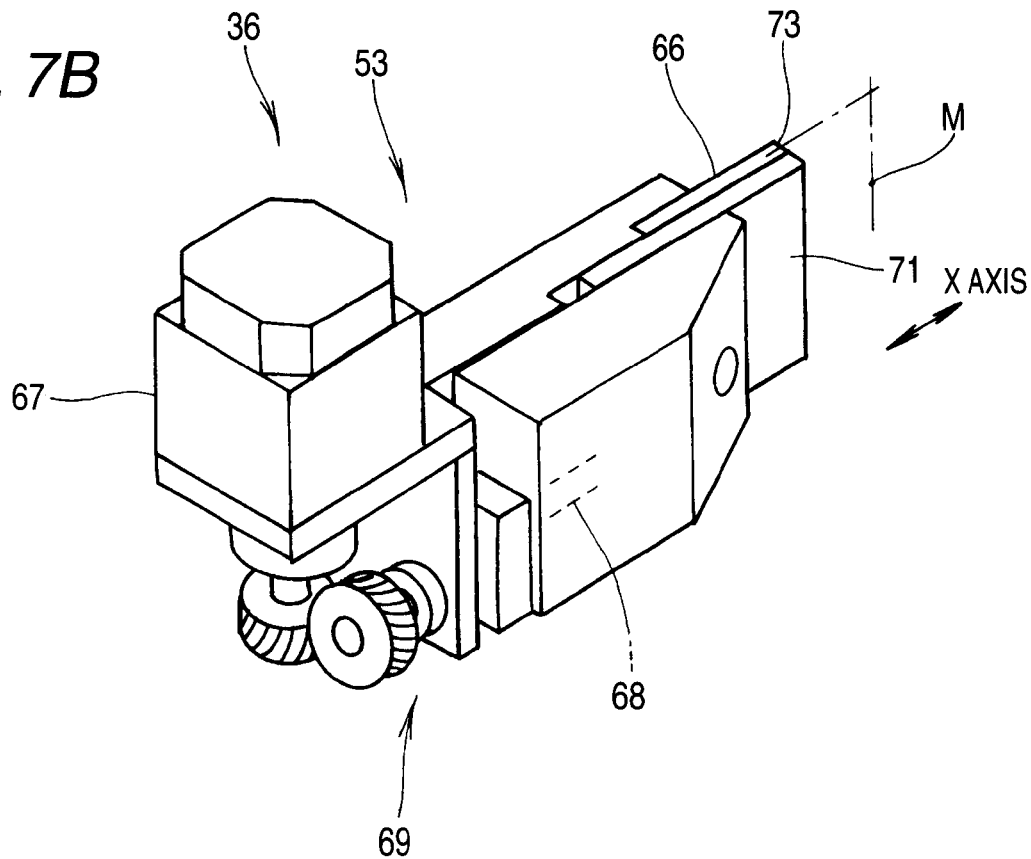
[FIG. 7B] An explanatory diagram of the bending unit equipped on the first bending unit.

FIGS. 7A, 7B are explanatory diagrams which illustrate the bending unit equipped on the first bending unit, in which FIG. 7A is a view resulting when the first bending unit is viewed in a direction indicated by an arrow VII in FIG. 5 and FIG. 7B is a perspective view of the bending unit 53.

In the bending unit 53, a material holder portion 66 is mounted on the slider 54 (refer to FIG. 5), a feeding unit 69 including an electric motor 67 and a feeding screw 68 is mounted on the material holder portion 66, and an internally threaded portion 72 of a bending die 71 is fittingly screwed on the feeding screw 68 and the bending die 71 is made to extend along the material holder portion 66, whereby the bending die 71 is caused to slide in the X axis direction by the feeding screw 68, so as to bend the corrugated belt plate materials 23 . . . (refer to FIG. 16). A pressing distal end 73 of the material holder portion 66 coincides with the rotational axis center M.

The second bending unit 37 (see FIG. 4) is similar to the first bending unit 36, but a bending die 71 is caused to slide in a Y axis direction by a feeding screw 68. Then, the corrugated belt plate materials 23 . . . (refer to FIG. 16) are bent by the bending die 71.

Figure 8:
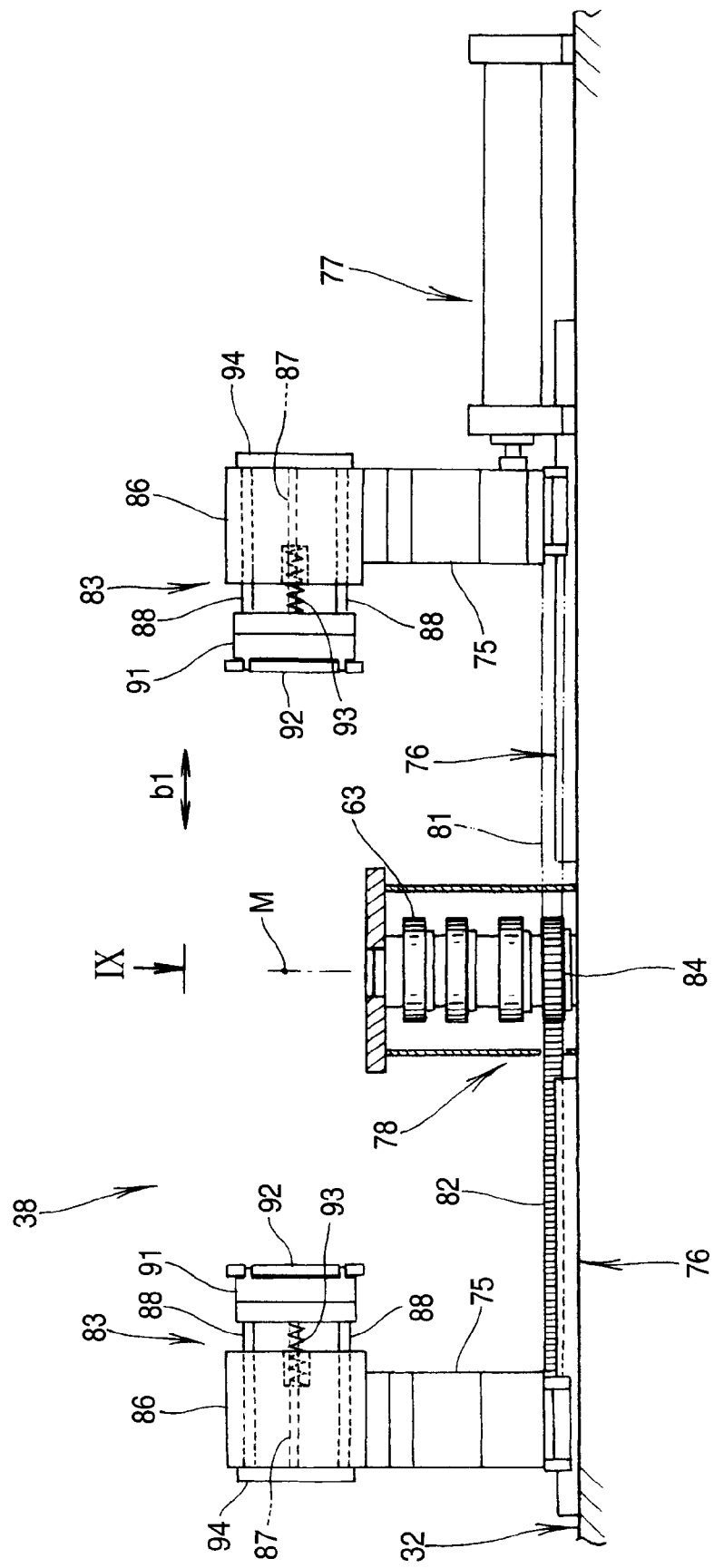
[FIG. 8] A view resulting when the assembling apparatus is seen in a direction indicated by an arrow VIII in FIG. 4.

FIG. 8 is a view resulting when the metal honeycomb catalyzer carrier assembling apparatus 31 is seen in a direction indicated by arrows VIII in FIG. 4 and shows the front (partly including sections) of the press roller unit 38 and a waiting state at an origin position.

Figure 9:
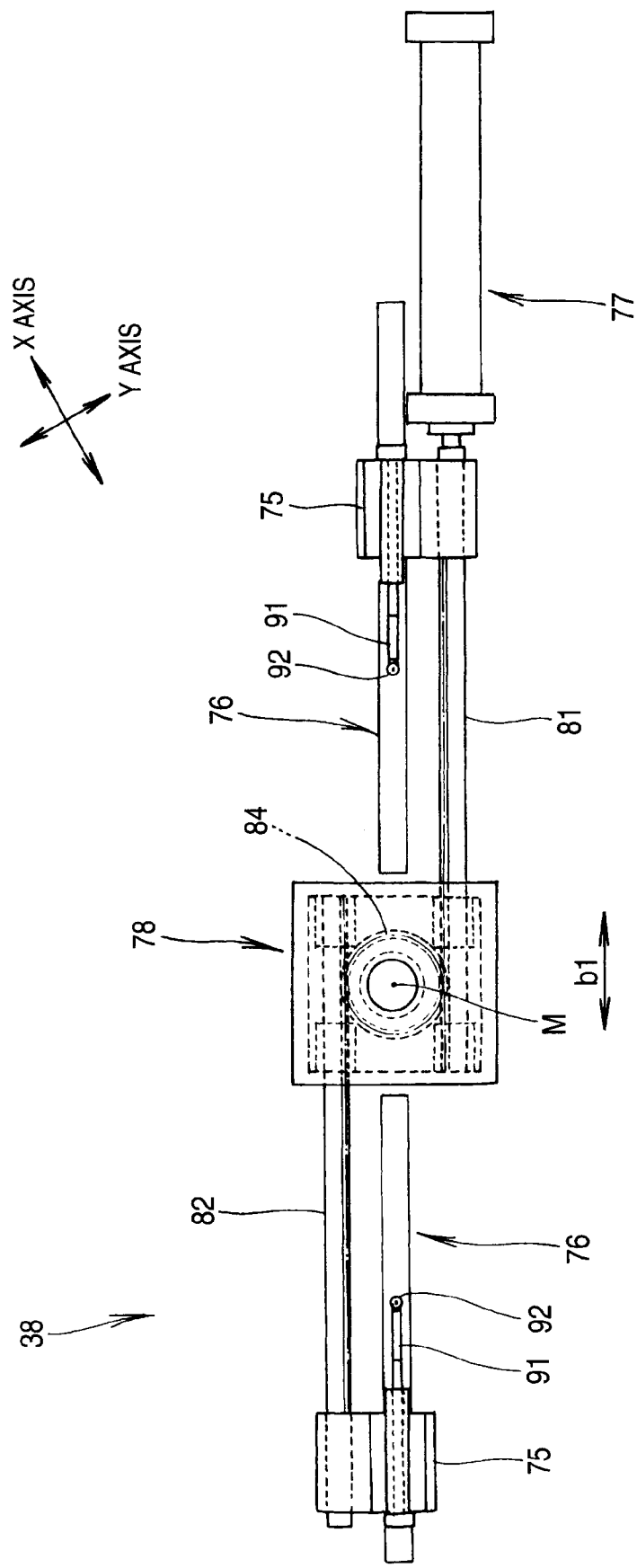
[FIG. 9] A view resulting when the assembling apparatus is seen in a direction indicated by an arrow IX in FIG. 8.

FIG. 9 is a view resulting when the pressure roller unit 38 is seen in a direction indicated by an arrow IX in FIG. 8 and shows a plan view of the press roller unit 38.

In the press roller unit 38, sliding rails 76, 76 each equipped with a slider 75 are mounted on the first-stage base 32, a pneumatic cylinder 77 is connected to one (lying on a right-hand side of the figure) of the sliders 75 and the pneumatic cylinder 77 is fixed to the first-stage base 32, a second synchronous unit 78 is disposed on the first-stage base 32, the one (lying on the right-hand side of the figure) of the sliders 75 is connected to a first rack 81 of the second synchronous unit 78, while the other (lying on a left-hand side of the figure) of the sliders 75 is connected to a second rack 82, and damping units 83, 83 are mounted on the sliders 75, whereby the sliders 75 are caused to slide (in a direction indicated by an arrow b1) in such a state that the damping units 83, 83 are synchronized. Reference numeral 84 denotes a second pinion which engages with the first and second racks 81, 82 of the second synchronous unit 78.

In the damping unit 83, a base table 86 is mounted on the slider 75, three guide shafts 87, 88, 88 are fitted in the base 86 in such a manner as to freely slide (in the direction indicated by the arrow b1), a support plate 91 is mounted on the guide shafts 87, 88, 88, a roller main body 92 is mounted on the support plate 91 in such a manner as to freely rotate about the Z axis, a compression spring 93 is disposed between the support plate 91 and the base table 86 via the guide shaft 87, and a stopper 94 is mounted at rear ends of the guide shafts 87, 88, 88, whereby the corrugated belt plate materials 23 . . . (refer to FIG. 16) are pressed towards the rotational axis center M by the roller main body 92.

Figure 10:
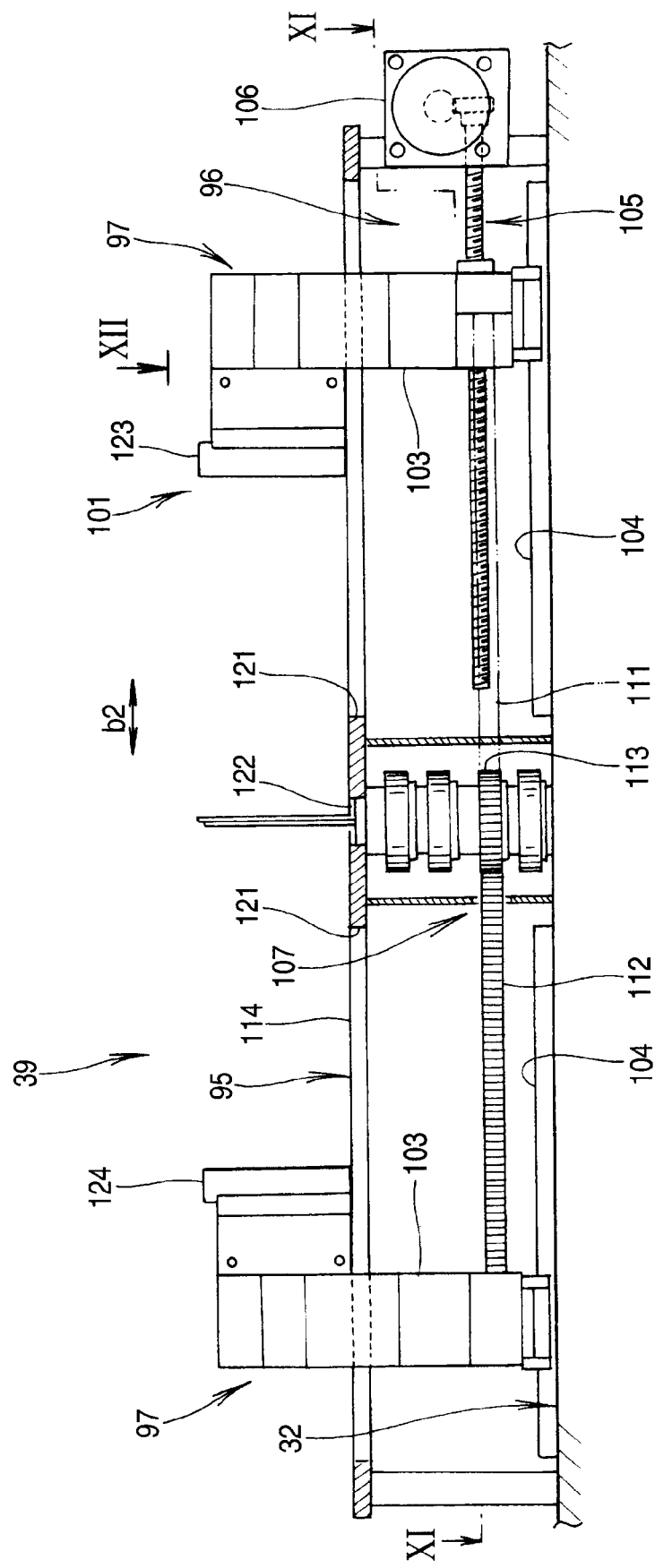
[FIG. 10] A view resulting when the assembling apparatus is seen in a direction indicated by an arrow X in FIG. 4.

FIG. 10 is a view resulting when the metal honeycomb catalyzer carrier assembling unit 31 is seen in a direction indicated by an arrow X in FIG. 4 and shows the front (partly including sections) of the die unit 39 and a waiting state at an origin position.

Figure 11:
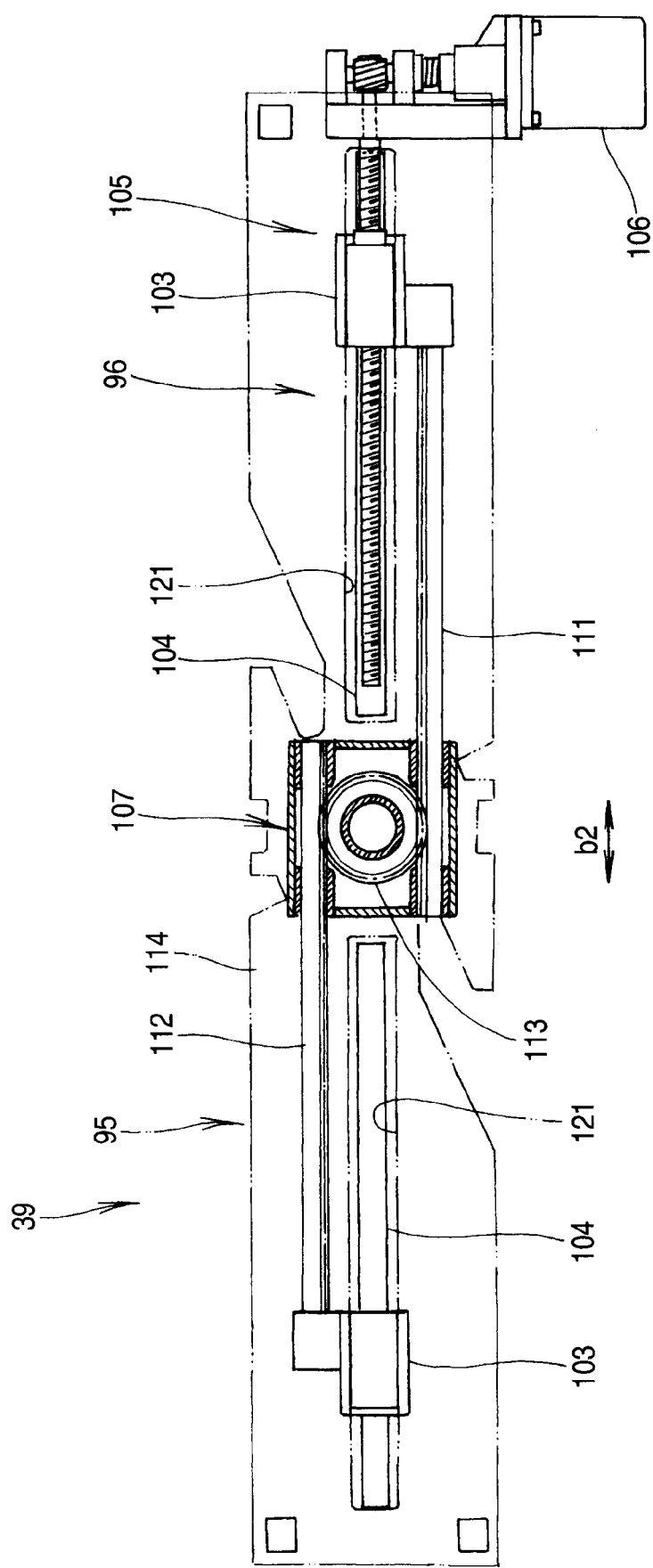
[FIG. 11] A sectional view taken along the line XI-XI in FIG. 10.

FIG. 11 is a sectional view taken along the line XI-XI in FIG. 10.

The die unit 39 is such that a long table 95 is mounted on the first-stage base 32, a driving unit 96 is disposed within the table 95, die mounting members 97, 97 are mounted on the driving unit 96, and a first movable die 123 and a second movable die 124 of a die 101 are mounted on each of the die mounting members 97, 97.

In the driving unit 96 which is disposed within the table 95, sliding rails 104, 104 each equipped with a slider 103 are mounted on the first-stage base 32, a ball screw mechanism 105 is mounted on one (lying on a right-hand side of the figure) of the sliders 103, an electric motor 106 is coupled to the ball screw mechanism 105 and the electric motor 106 is fixed to a side portion of the table 95, a third synchronous unit 107 is disposed on the first-stage base 32, the one (lying on the right-hand side of the figure) of the sliders 103 is connected to a first rack 111 of the third synchronous unit 107, and a second rack 112 of the third synchronous unit 107 is connected to the other (lying on a left-hand side of the figure) of the sliders 103, whereby the sliders 103 are caused to slide (in a direction indicated by an arrow b2) in such a state that the die 101 is synchronized. Reference numeral 113 denotes a third pinion which engages with the first and second racks 111, 112 of the third synchronous unit 107.

The table 95 includes at an upper portion thereof a table main body 114 on which the corrugated belt plate materials 23 . . . (refer to FIG. 16) are placed, first openings 121, 121, which are each formed into an elongate hole shape, are opened in the table main body 114 so that the die mounting members 97, 97 are passed therethrough, and a second opening 122, which is circular, is opened in a center of the table main body 114.

Figure 12:
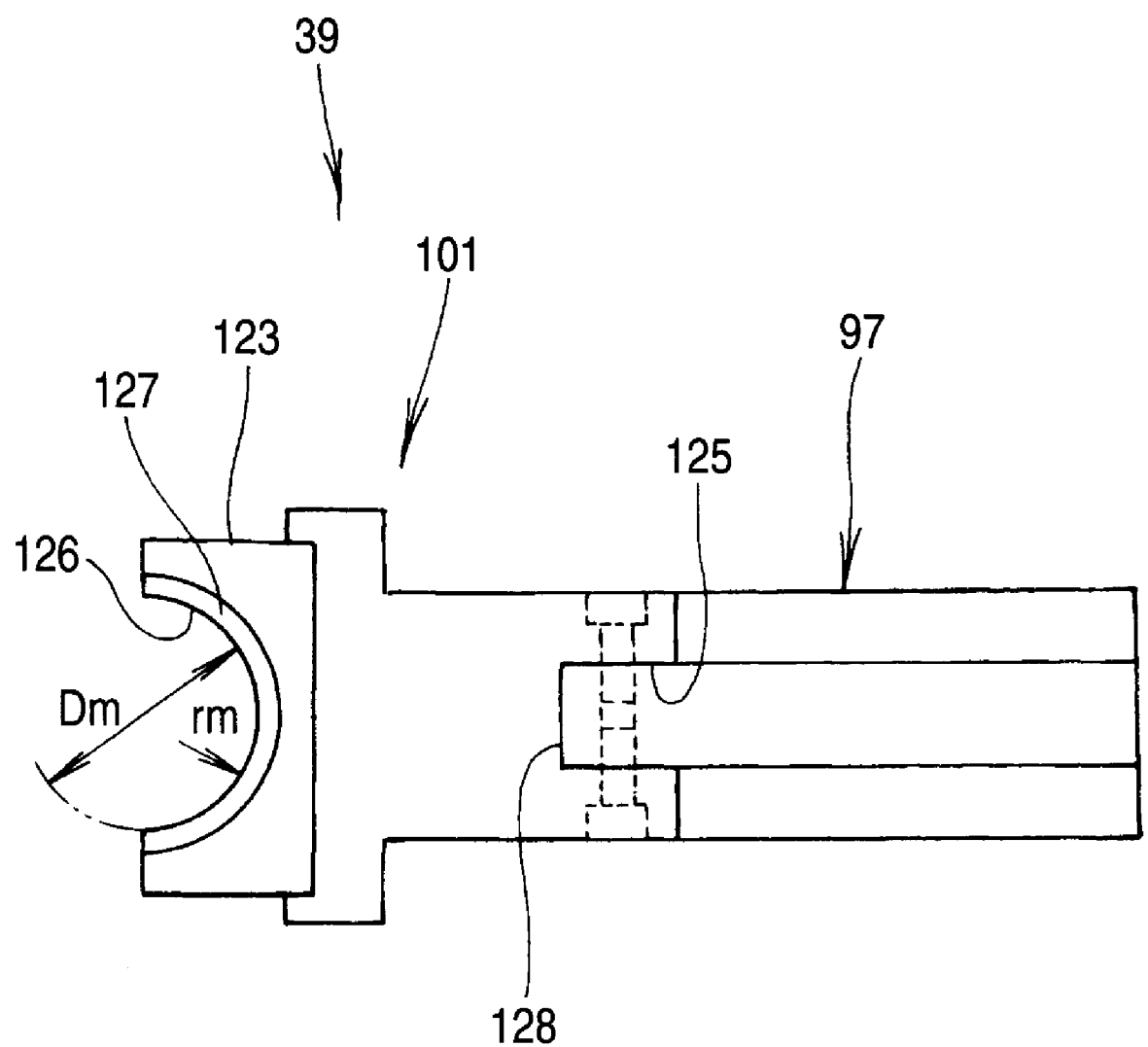
[FIG. 12] A view resulting when the assembling apparatus is seen in a direction indicated by an arrow XII in FIG. 10.

FIG. 12 is a view resulting when the die unit 39 is seen in a direction indicated by an arrow XII in FIG. 10 and is a plan view of the die 101.

The die 101 is made up of the first movable die 123 and the second movable die 124 (refer to FIG. 10, and in the first movable die 123 and is such that a fastening recess portion 125 in which the die mounting member 97 is mounted is formed at one end thereof, while a die surface 126 is carved at the other end thereof, and a positioning chamfered portion 127 is formed on an upper edge of the die surface 126. This die surface 126 is formed into a semi-circular shape and is adapted to interlock with the other die surface 126 which is disposed to face the die surface 126. The pair of die surfaces 126, 126 move in an opposite direction to each other towards the rotational center of the rotational holding shaft so as to fasten and release a workpiece.

The die surface 126 is a portion which is carved with a diameter Dm and a radius rm, and the radius rm is slightly smaller (for example, 1 mm) than the radius rc of the inside diameter of the tubular member 13 (refer to FIG. 1).

The second movable die 124 (refer to FIG. 10) is similar to the first movable die 123.

A raised portion 128 is formed on the die mounting member 97 in such a manner as to fit in the fastening recessed portion 125.

Figure 13:
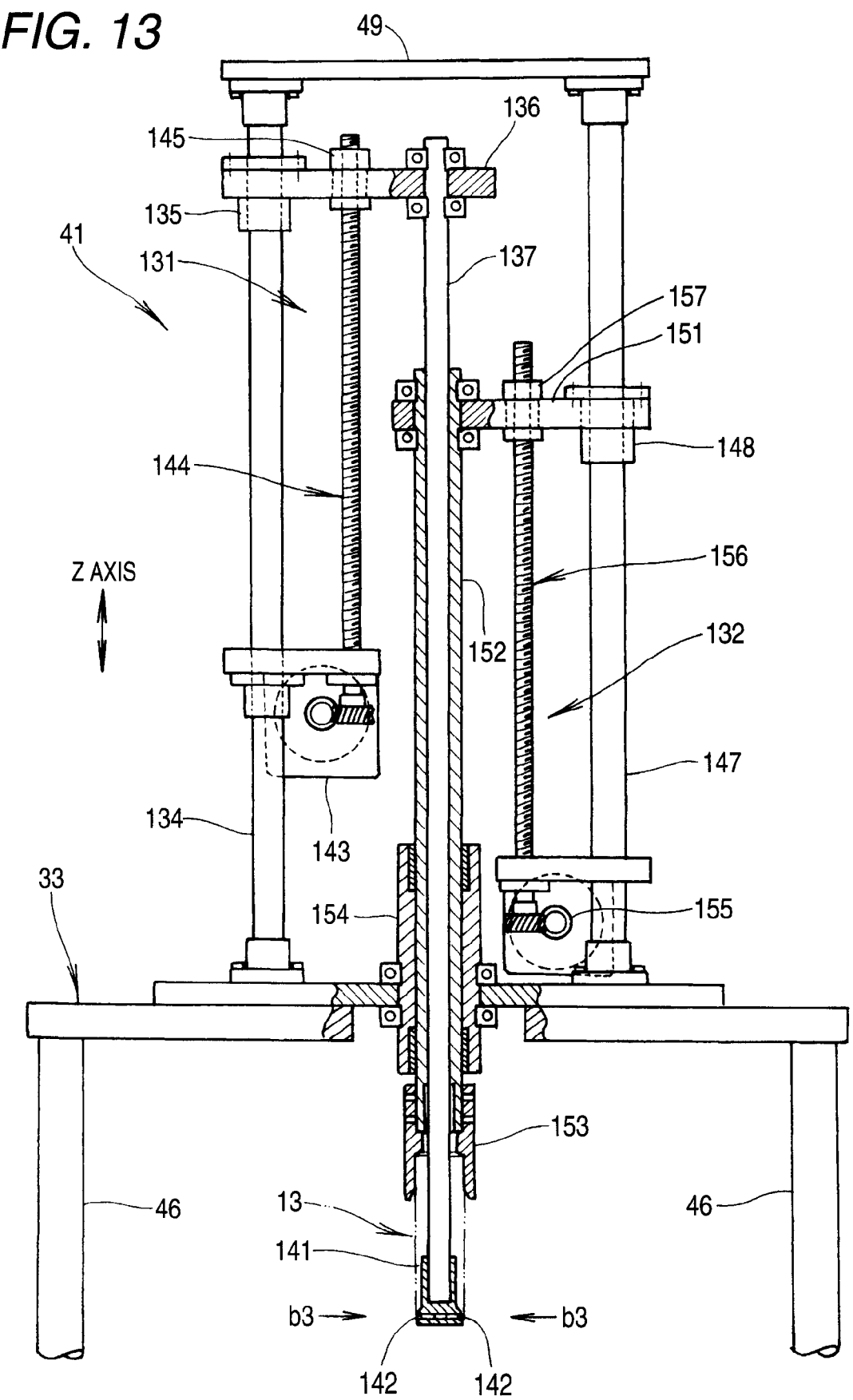
[FIG. 13] A sectional view taken along the line XIII-XIII in FIG. 3.

FIG. 13 is a sectional view taken along the line XIII-XIII in FIG. 3 and shows the front of the work presser unit 41 and a waiting state at an origin position. The description will be made referring to FIG. 3, as well.

The work presser unit 41 is made up of a honeycomb presser unit 131 and a tube support unit 132.

In the honeycomb presser unit 131, a first sliding guide 134 is erected on the second-stage base 33, one end of a push rod 137 is fixed to a sliding portion 135 of the first sliding guide 134 via a coupling plate 136, a pressing portion 141 is mounted on the other end of the push rod 137, a hook member 142 is mounted on a side of the pressing portion 141, an electric motor 143 is fixed to the first sliding guide 134, a screw mechanism 144 is coupled to the electric motor 143, and a nut portion 145 of the screw mechanism 144 is mounted on a center of the coupling plate 136, whereby the push rod 137 is caused to slide (in a Z axis direction) by the screw mechanism 144, and while winding is in operation, the honeycomb presser unit 131 presses against the corrugated belt plate materials 23 . . . (refer to FIG. 16) in such a state that the tubular member 13 is placed thereon.

The pressing portion 141 has a pin receiving hole 146 (refer to FIG. 23) for receiving therein a distal end of the rotational holding shaft 167 (refer to FIGS. 2, 15) so as to press against the center of the same shaft.

The hook member 142 is activated when a force is applied to a distal end thereof (in a direction indicated by arrows b3).

In the tube support unit 132, a second sliding guide 147 is erected on the second-stage base 33, one end of a hollow push shaft 152 is fixed to a sliding portion 148 of the second sliding guide 147 via a coupling plate 151, a tubular member holder 153 is mounted at a distal end of the hollow push shaft 152, the hollow push shaft 152 is fitted in a bearing portion 154 fixed to the second-stage base 33 side in such a manner as to freely slide (in the Z axis direction), an electric motor 155 is fixed to the second sliding guide 147, a screw mechanism 156 is connected to the electric motor 155, and a nut portion 157 of the screw mechanism 156 is mounted at a center of the coupling plate 151, whereby the push hollow shaft 152 is caused to slide (in the Z axis direction) by the screw mechanism 156.

The hollow push shaft 152 supports the push rod 137 of the honeycomb pressure unit 131 in such a manner that the push rod 137 freely slides (in the Z axis direction) and slides freely whether or not the push rod 137 slides.

In addition, the first and second sliding guides 134, 147 and the pillar 48 (refer to FIG. 1) are all coupled to the coupling top plate 49.

Figure 14:
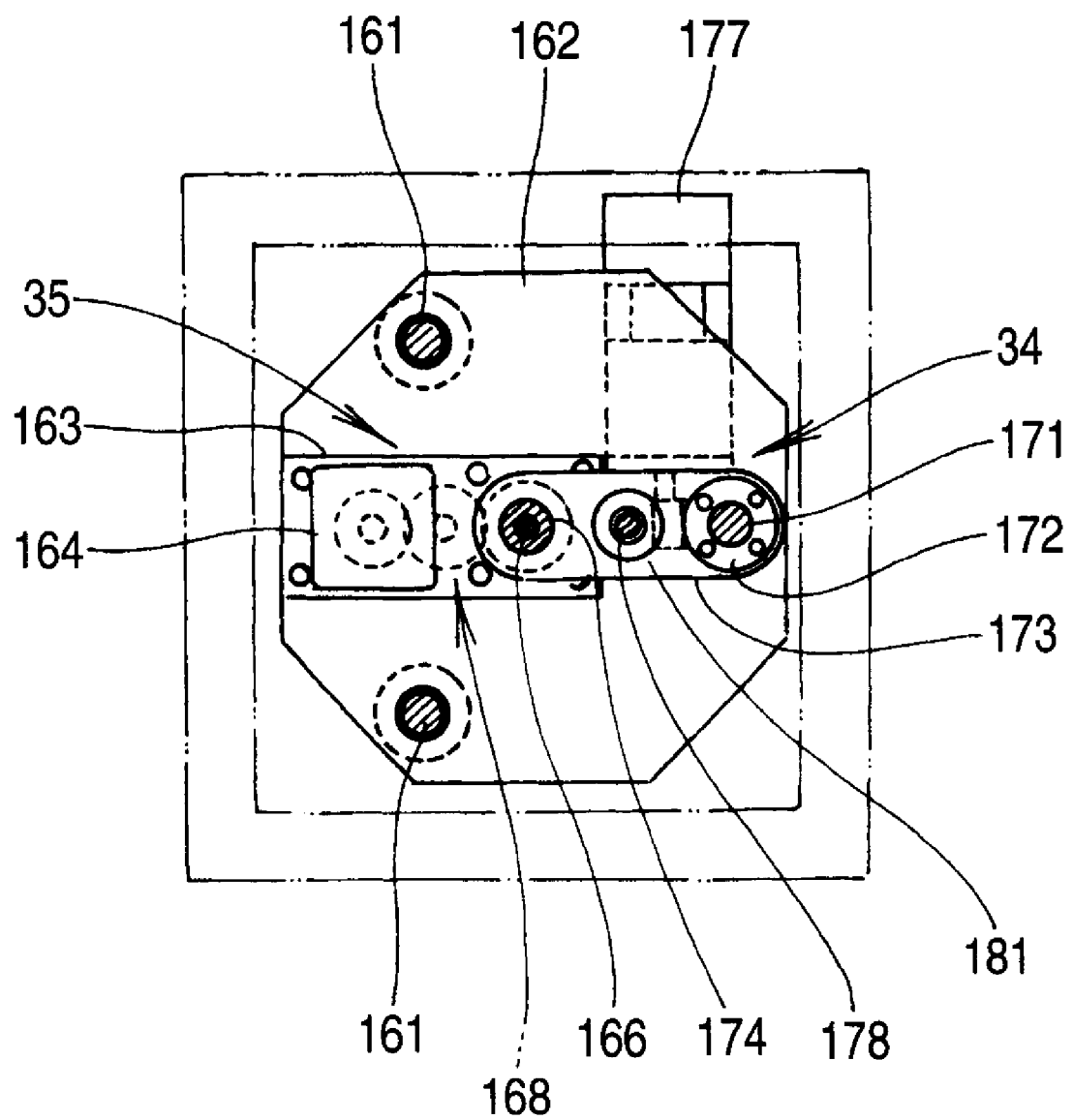
[FIG. 14] A sectional view taken along the line XIV-XIV in FIG. 2.

FIG. 14 is a sectional view taken along the line XIV-XIV in FIG. 2 and shows plan views of the winding rotational unit 35 and the honeycomb push-out and insertion unit 34.

Figure 15:
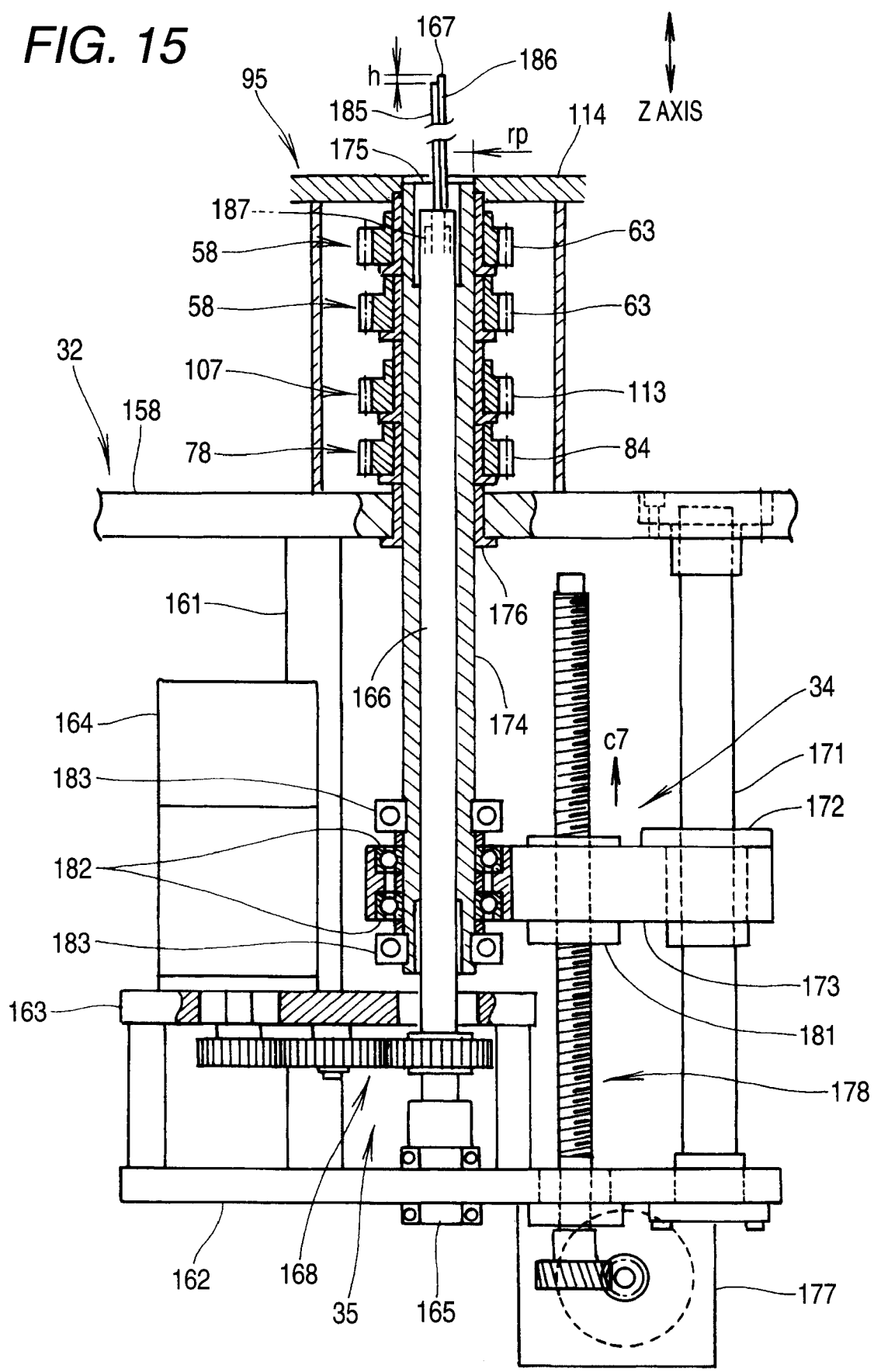
[FIG. 15] A sectional view showing a winding rotational unit and a honeycomb push-out and insertion unit which are equipped on the assembling apparatus of the invention.

FIG. 15 shows sectional views of the winding rotational unit 35 and the honeycomb push-out and insertion unit which are equipped on the assembling apparatus of the invention and corresponds to a detailed view (partly shown in section) of FIG. 2, showing a waiting state of the honeycomb push-out and insertion unit 34 at an origin position thereof.

In the winding rotational unit 35, a bottom plate 162 is mounted on an upper plate 158 of the first-stage base 32 via pillars 161, 161, an electric motor 164 is mounted on the bottom plate 162 via a rest table 163, a bearing 165 is fixed to the bottom plate 162, one end of a rod 166 is fitted in the bearing 165, the rotational holding shaft 167 is fixed to the other end of the rod 166 and a transmission unit 168 is connected to the rod 166, whereby when the electric motor 164 is activated, the rotational holding shaft 167 rotates about the Z axis via the transmission unit 168.

In the honeycomb push-out and insertion unit 34, one end of a sliding guide 171 is mounted on the upper plate 158 of the first-stage base 32, the other end of the sliding guide 171 is mounted on the bottom plate 162, one end of a hollow push shaft 174 is mounted on a sliding portion 172 of the sliding guide 171 via a coupling plate 173, a pushing end portion 175 is formed at a distal end of the hollow push shaft 174, the hollow push shaft 174 is fitted in the upper plate 158 of the first-stage base 32 via a bush 176 in such a manner as to freely slide (in the Z axis direction), an electric motor 177 is fixed to the bottom plate 162, a screw mechanism 178 is coupled to the electric motor 177, and a nut portion 181 of the screw mechanism 178 is mounted at a center of the coupling plate 173, whereby the hollow push shaft 174 is caused to slide (in the Z axis direction) by the screw mechanism 178.

The hollow push shaft 174 has bearings 182, 182 which are fitted between the coupling plate 173 and the one end thereof and stoppers 183, 183 for restricting the movement (in the Z axis direction) of the coupling plate 173 and rotates about the Z axis freely. In addition, the hollow push shaft 174 supports the rod 166 of the winding rotational unit 35 in such a manner as to rotate freely about the Z axis.

The radius of an outside diameter of the hollow push shaft 174 is set to rp, and the radius rp is slightly smaller than the radius rm (refer to FIG. 12) of the die surface 126 (refer to FIG. 12) (for, example, 1 mm).

The rotational holding shaft 167 includes a first pin 185, a second pin 186 and a spring 187 which closely secures the first and second pins 185, 186 to each other and holds the corrugated belt plate 23 (refer to FIG. 16) with the force of the spring 187. Reference character h denotes a different in height between the height of the first pin 185 and the height of the second pin 186.

Next, a metal honeycomb catalyzer carrier assembling method of the invention will be described while describing the function of the metal honeycomb catalyzer carrier assembling apparatus 31.

A metal honeycomb catalyzer carrier assembling method includes a first step of setting the tubular member, a second step of setting the belt plates, a third step (made up of first and second bending steps) of bending, a fourth step of winding, a fifth step of forming and a sixth step of inserting. Note that the ordinal numbers (the first) are given here to clarify the sequence of the steps, and hence, the contents of the steps are not differentiated even in the event that the ordinal numbers are given to the steps. For example, the second step of setting the belt plates is identical to the step of setting the belt plates.

Next, these first to sixth steps will be described in a specific way.

Figure 16:
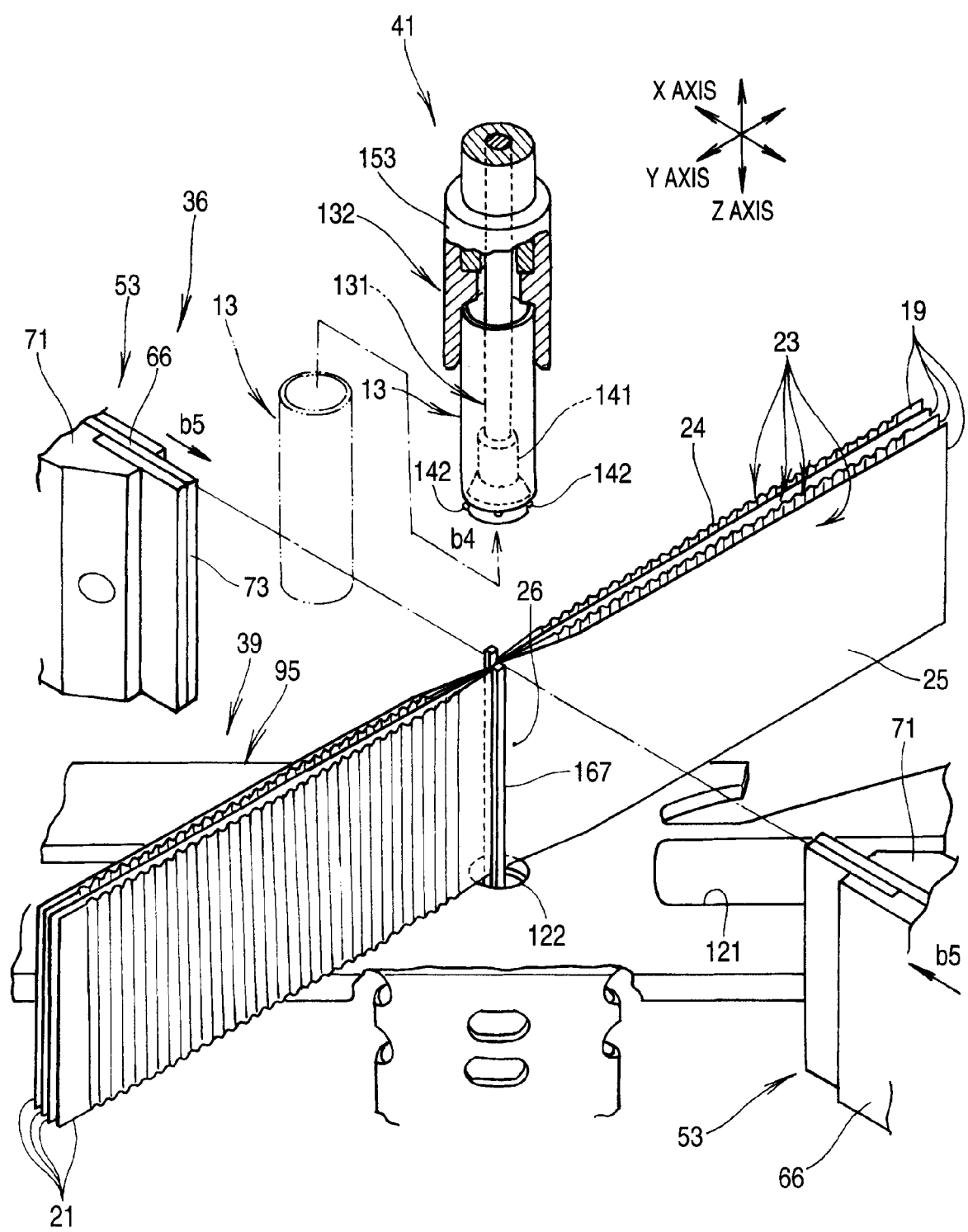
[FIG. 16] An explanatory diagram illustrating a first step of setting a tubular member and a second step of setting a belt plate which are executed in the metal honeycomb catalyzer carrier assembling method of the invention.

FIG. 16 is an explanatory diagram illustrating the first step of setting the tubular member and the second step of setting the belt plates which are executed in the metal honeycomb catalyzer carrier assembling method of the invention.

In the first step of setting the tubular member, firstly, the worker operates controls on the control panel to lower the pressing portion 141 of the honeycomb presser unit 131 from its waiting position so that the tubular member 13 is mounted on the pressing portion 141 as indicated by an arrow b4. As this occurs, the tubular member 13 is once raised higher than the hook member 142 mounted on the side of the pressing portion 141, and the tubular member 13 is then placed on the hook member 142 which has now restored its normal position at a lower end thereof. Following this, the pressing portion 141 is raised to a position where the pressing portion 141 does not interfere with the belt plate (the corrugated belt plate material) 23 which is being mounted, and an upper end of the tubular member 13 is fitted in the tubular member holder 153 as shown in FIG. 16, whereupon the first step of setting the tubular member is completed.

Since the tubular member 13 is set in advance in the first step of setting the tubular member, the tubular member 13 can be placed on the die 101 continuously after the belt plates (the corrugated belt plate materials) 23 have been wound in a downstream step (see FIG. 12), and as a result, the insertion work of inserting the wound honeycomb body 12 (refer to FIG. 23) into the tubular member 13 is facilitated.

Following this, the second step of setting the belt plates is executed.

In the second step of setting the belt plates, four corrugated belt plate materials 23 which have been formed in advance to be made up of alternating layers of corrugated portions 24 and flat portions 25 are superposed on each other, and the superposed corrugated belt plate materials 23 . . . are inserted into the rotational holding shaft 167 at central portions 26 thereof, and the corrugated belt plate materials 23 are then placed on the table 95 of the die unit 39.

Following this, the honeycomb presser unit 131 and the tube support unit 132 of the work presser unit 41 are lowered integrally, so that the corrugated belt plate materials 23 . . . are held in a widthways direction thereby by the pressing portion 141 of the honeycomb presser unit 131 and the table 95 in such a manner as to be held therebetween and at the same time, the pin receiving hole 146 (refer to FIG. 23A) formed in the pressing portion 141 fits on the distal end of the rotational holding shaft 167.

Following this, the third step of bending (the first bending step) is executed.

In the first bending step, the worker pushes on a control button on the control panel so as to activate the first bending unit 36, whereby the belt plates (the corrugated belt plate materials) 23 . . . are brought into abutment with the rotational holding shaft 167 which holds the central portions 26 of the corrugated belt plate materials 23 . . . so as to be bent. The step will be described specifically below.

Figure 17:
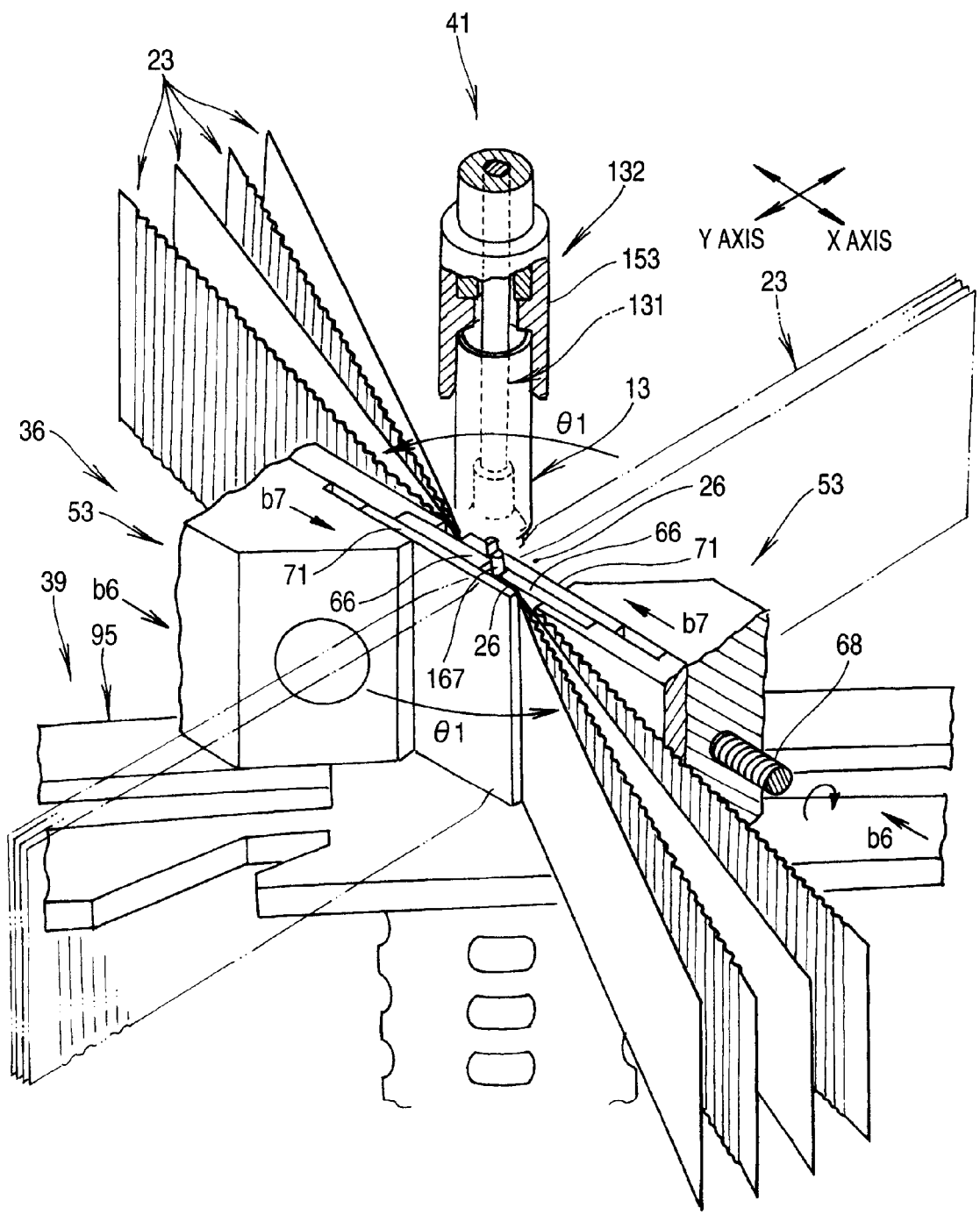
[FIG. 17] An explanatory diagram illustrating a third step of bending (a first bending step) which is executed in the metal honeycomb catalyzer carrier assembling method of the invention.

FIG. 17 is an explanatory diagram illustrating the third step of bending (the first bending step) which is executed in the metal honeycomb catalyzer carrier assembling method of the invention. Explanation is made with also reference to FIGS. 4 to 7.

Specifically speaking, in the first bending step, the corrugated belt plate materials 23 . . . are bent at the central portions 26 by the angle $\theta 1$ (for example, 90°), $\theta 1$ by the first bending unit 36.

Namely, the bending units 53, 53 of the first bending unit 36 slide in a direction X (in a direction indicated by an arrow b6) in a synchronized state based on information given by the control button pushed on the control panel, and the rotational holding shaft 167 is held by the material holder portions 66, 66 therebetween.

As this occurs, following the holding of the rotational holding shaft 167 by the material holder portions 66, 66, the electric motors 67, 67 of the bending units 53, 53 may be activated based on pre-set conditions. When the electric motors 67, 67 are so activated, the feeding screws 68, 68 feed the bending dies 71, 71 forwards as indicated by arrows b7, b7 so as to bend the corrugated belt plate materials 23 . . . with the bending radius r1 (refer to FIG. 1) and by the angle $\theta 1$ (for example, 90°), $\theta 1$ in such a manner that the position of the central portions 26 of the corrugated belt plate materials 23 . . . which is held by the rotational holding shaft 167 therein is brought into contact with the rotational holding shaft 167.

Following this, the bending units 53, 53 are returned to their origin positions, putting the first bending unit 36 into the waiting state.

Figure 18:
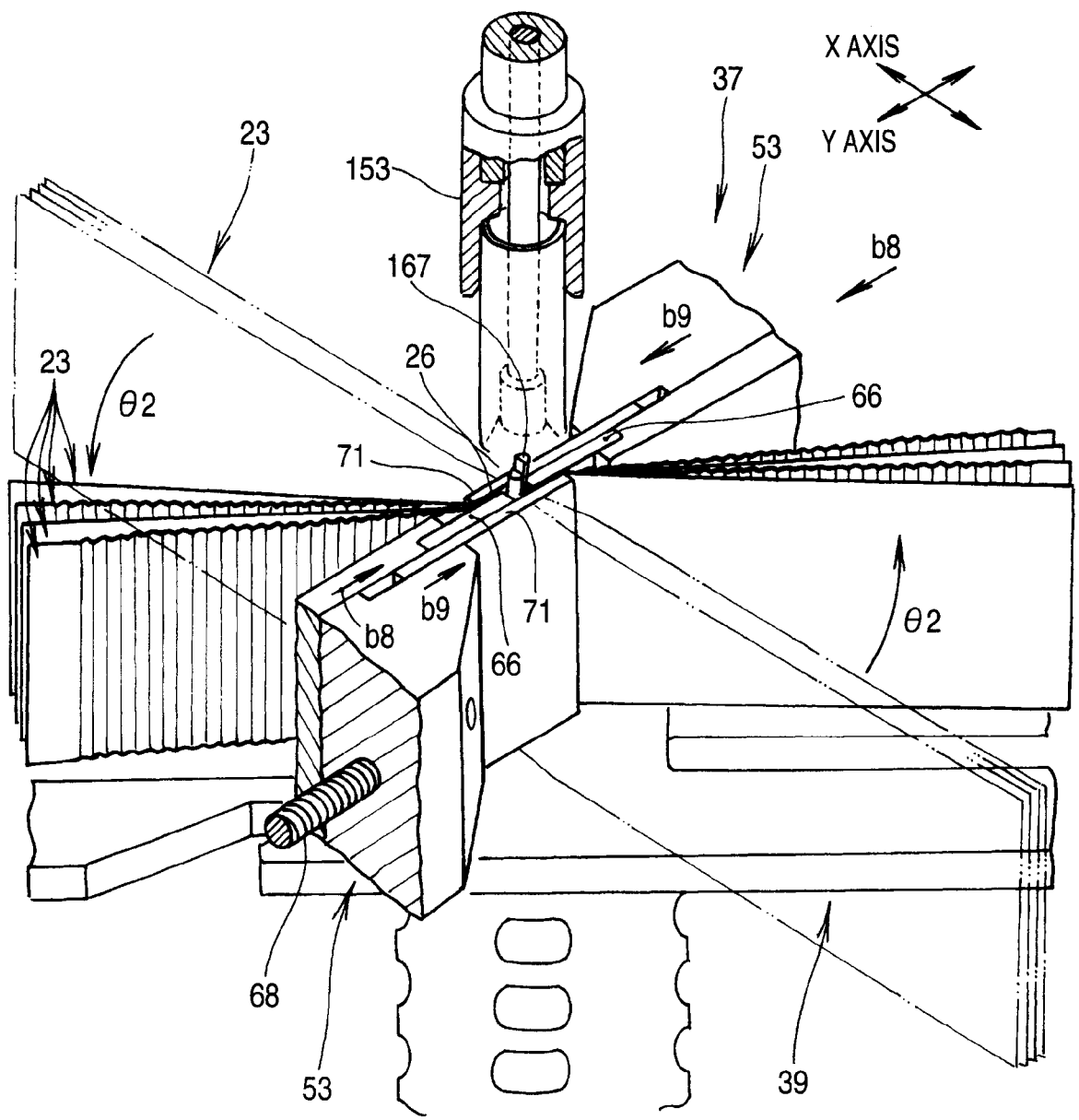
[FIG. 18] An explanatory diagram illustrating the third step of bending (a second bending step) which is executed in the metal honeycomb catalyzer carrier assembling method of the invention.

FIG. 18 is an explanatory diagram illustrating the third step of bending (the second bending step) which is executed in the metal honeycomb catalyzer carrier assembling method. The description will be made while referring to FIGS. 4 to 7, as well.

While the second bending step is substantially similar to the first bending step, by activating further the second bending unit 37 (in a direction indicated by arrows b8, b8) at a position continuous to the bent portion which was bent in the first bending step, the belt plates (the corrugated belt plate materials) 23 . . . are brought into abutment with the rotational holding shaft 167 which holds the central portions 26 of the corrugated belt plate materials 23 . . . so as to be bent.

In the second bending step, after the central portions 26 of the corrugated belt plate materials 23 . . . has been bent with the start-winding bending radius r1 (refer to FIG. 1) and by the angle $\theta 1$ (for example, 90°), the second bending unit 37 may be activated to bend the corrugated belt plate materials 23 . . . by an angle $\theta 2$ (for example, 90°) at the central portions 26 thereof.

To be more specific, the bending units 53, 53 of the second bending unit 37 slide in the Y axis direction (in the direction indicated by the arrows b8) in a synchronized state based on information that the first bending unit 36 has returned to its origin point and information from the control unit so as to hold the portion of the corrugated belt plate materials 23 . . . which has been started to be wound with the bending radius r1 by the material holder portions 66, 66 therebetween, together with the rotational holding shaft 167.

Following this, based on information that the aforesaid holding of the corrugated belt plate materials 23 . . . by the material holder portions 66,66 has occurred, the electric motors 67, 67 are activated, so that the bending dies 71, 71 are caused to travel forwards as shown by arrows b9, b9 by the feeding screws 68, 68, whereby the corrugated belt plate materials 23 . . . are bent with the start-winding bending radius r1 (refer to FIG. 1) and by the angle θ2 (for example, 90°) in such a manner that the position of the central portions 26 of the corrugated belt plate materials 23 . . . which is held by the rotational holding shaft 167 therein is brought into contact with the rotational holding shaft 167.

Following this, the bending units 53, 53 are returned to their origin positions, and the second bending unit 37 is put into its waiting state.

Thus, in the bending steps in which the belt plates are bent by bringing them into abutment with the rotational holding shaft, since the belt plates (the corrugated belt plate materials) 23 are bent by bringing them into abutment with the rotational holding shaft 167 which holds the central portions 26 of the belt plates (the corrugated belt plate materials) 23, the start-winding bending radius r1 (refer to FIG. 1) can be reduced.

Thus, since the metal honeycomb catalyzer carrier assembling apparatus 31 is made up of the rotational holding shaft 167 which holds the central portions 26 of the belt plates (the corrugated belt plate materials) 23 and rotates freely, the first and second bending units 36, 37 which effect bending at the position of the rotational holding shaft 167 and the winding unit 42 equipped with the press roller unit 38 adapted to press the belt plates (the corrugated belt plate materials) 23 from outside, the belt plates (the corrugated belt plate materials) 23 are brought into contact with the rotational holding shaft 167 to thereby be bent by the first and second bending units 36, 37, and the start-winding bending radius r1 (refer to FIG. 1) is made smaller. Consequently, not only the start-winding bending radius r1 (refer to FIG. 1) can be made smaller but also too many labor hours are not necessary to reduce the start-winding bending radius.

Figure 19:
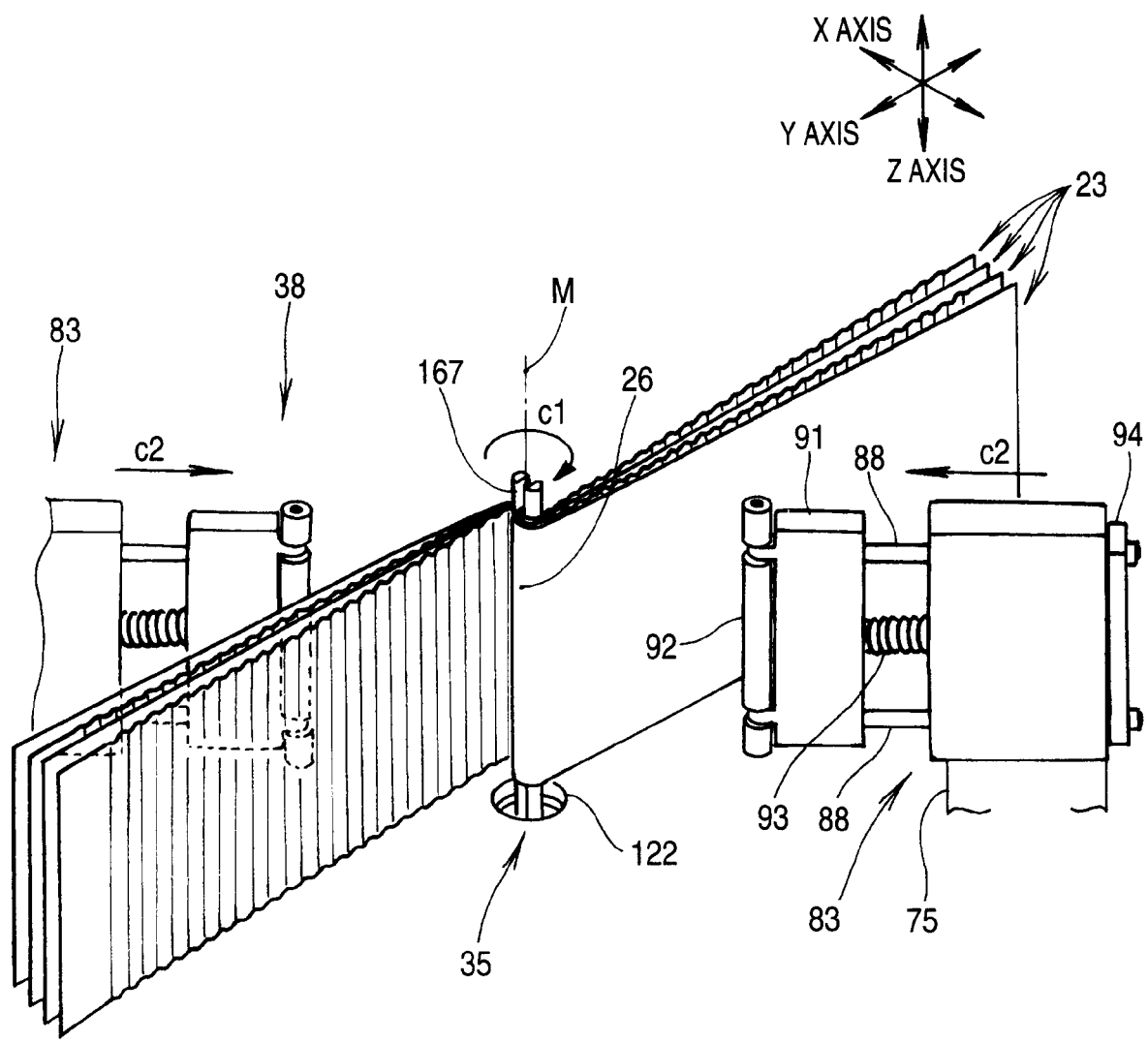
[FIG. 19] A first explanatory diagram illustrating a fourth step of winding which is executed in the metal honeycomb catalyzer carrier assembling method of the invention.

FIG. 19 is a first explanatory diagram of the fourth step of winding which is executed in the metal honeycomb catalyzer carrier assembling method of the invention. Note that as shown in FIGS. 17, 18, while the tubular member holder 153 of the tube support unit 132 is now being pushed down, no such illustration is provided in the figure.

Figure 20:
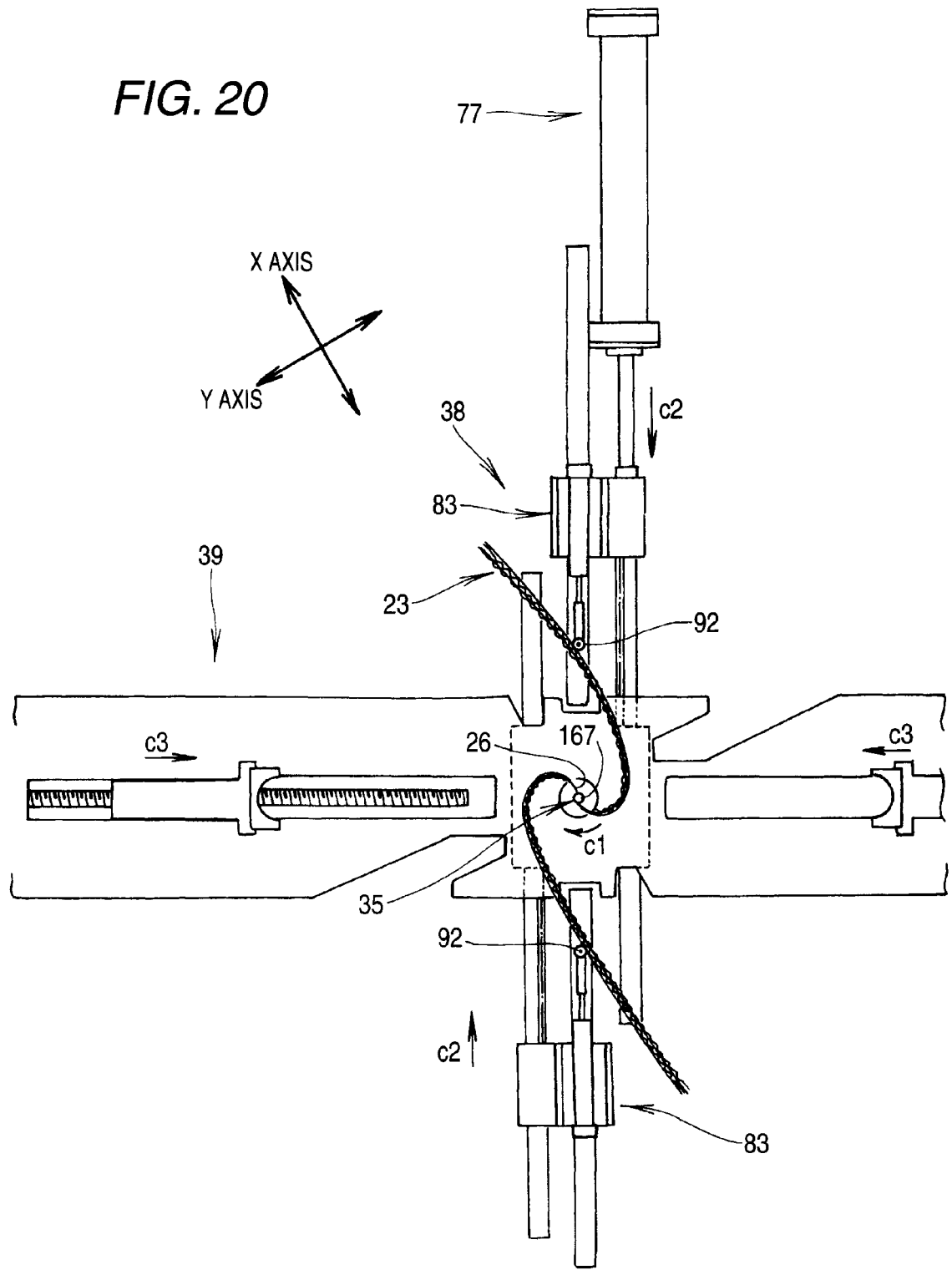
[FIG. 20] A second explanatory diagram illustrating the fourth step of winding which is executed in the metal honeycomb catalyzer carrier assembling method of the invention.

FIG. 20 is a secondary explanatory diagram of the fourth step of winding which is executed in the metal honeycomb catalyzer carrier assembling method of the invention. Note that as shown in FIGS. 17, 18, while the tubular member holder 153 of the tube support unit 132 is now being pushed down, no such illustration is provided in the figure.

In the fourth step of winding, the central portions 26 of the belt plates (the corrugated belt plate materials) 23 are held by the rotational holding shaft 167 therein, and the rotational holding shaft 167 is rotated to wind the belt plates (the corrugated belt plate materials) 23 around the Z axis, whereby the belt plates (the corrugated belt plate materials) 23 is wound in a direction indicated by an arrow c1, while a resulting wound belt plate (corrugated belt plate material) 23 is being pressed in a direction indicated by arrows c2, c2 from outside towards the rotation axis center M, so that the belt plates (the corrugated belt plate materials) are wound round into a substantially cylindrical shape.

To be specific, based on information that the second bending unit 37 has returned to its origin point and information from the control unit, the pneumatic cylinder 77 of the press roller unit 38 causes the damping units 83, 83 to slide (in the direction indicated by the arrows c2, c2) to press against the corrugated belt plate materials 23 . . . in synchronism with the activation thereof. Based on information that the press roller 38 is located at a predetermined position, the winding rotational unit 35 starts to operate.

The rotational holding shaft 167 rotates together with the rod 166 by the electric motor 164 of the winding rotational unit 35 shown in FIG. 15 to wind the corrugated belt plate materials 23 . . . .

In association with the winding rotational unit 35 winding the corrugated belt plate materials 23 . . . , the press roller unit 38 slides (in the direction indicated by the arrows c2, c2) to correspond the remaining lengths of the corrugated belt plate materials 23 . . . so as to support the remaining portions of the corrugated belt plate materials 23 . . . from outside to thereby continue to control the rotation of the remaining portions of the corrugated belt plate materials 23 . . . (refer to FIG. 21).

Thus, in the fourth step of winding, since the belt plates (the corrugated belt plate materials) 23 are wound in the direction indicated by the arrow c1 by holding the central portions 26 of the belt plates (the corrugated belt plate materials) 23 by the rotational holding shaft 167 and winding them around the Z axis and the belt plates (the corrugated belt plate materials) 23 are pushed in the direction indicated by the arrows c2, c2 from outside towards the rotational axis center M so as to be wound into the substantially cylindrical shape, a slack is made difficult to be produced in the belt plates (the corrugated belt plate materials) 23 when they are wound round, whereby the belt plates (the corrugated belt plate materials) 23 can be wound tight.

Since the metal honeycomb catalyzer carrier assembling apparatus 31 includes the press roller unit 38, a tensile resistance can be added to the belt plates (the corrugated belt plate materials) 23 by the pressure roller unit 38 when winding the belt plates (the corrugated belt plate materials) 23, and the remaining portions of the belt plates (the corrugated belt plate materials) 23 can be continuously wound round the portion where the start-winding bending radius r1 (refer to FIG. 1) is made smaller. As a result, there is no need to pull the belt plates (the corrugated belt plate materials) 23 directly in the longitudinal direction, whereby the construction for winding the belt plates (the corrugated belt plate materials) 23 tight is simplified, and as a result, the construction of the metal honeycomb catalyzer carrier assembling apparatus 31 is simplified.

When the winding rotational unit 35 finishes winding the corrugated belt plate materials 23 . . . , the die unit 39 is caused to slide (in a direction indicated by arrows c3, c3), whereby the fifth step of forming is executed.

Note that the activation timing of the die unit 39 is arbitrary, and for example, the worker may manipulate a control button to activate the die unit 39, or the die unit 39 may be activated based on information of the winding rotational unit 35 and information of the press roller unit 38.

Figure 21:
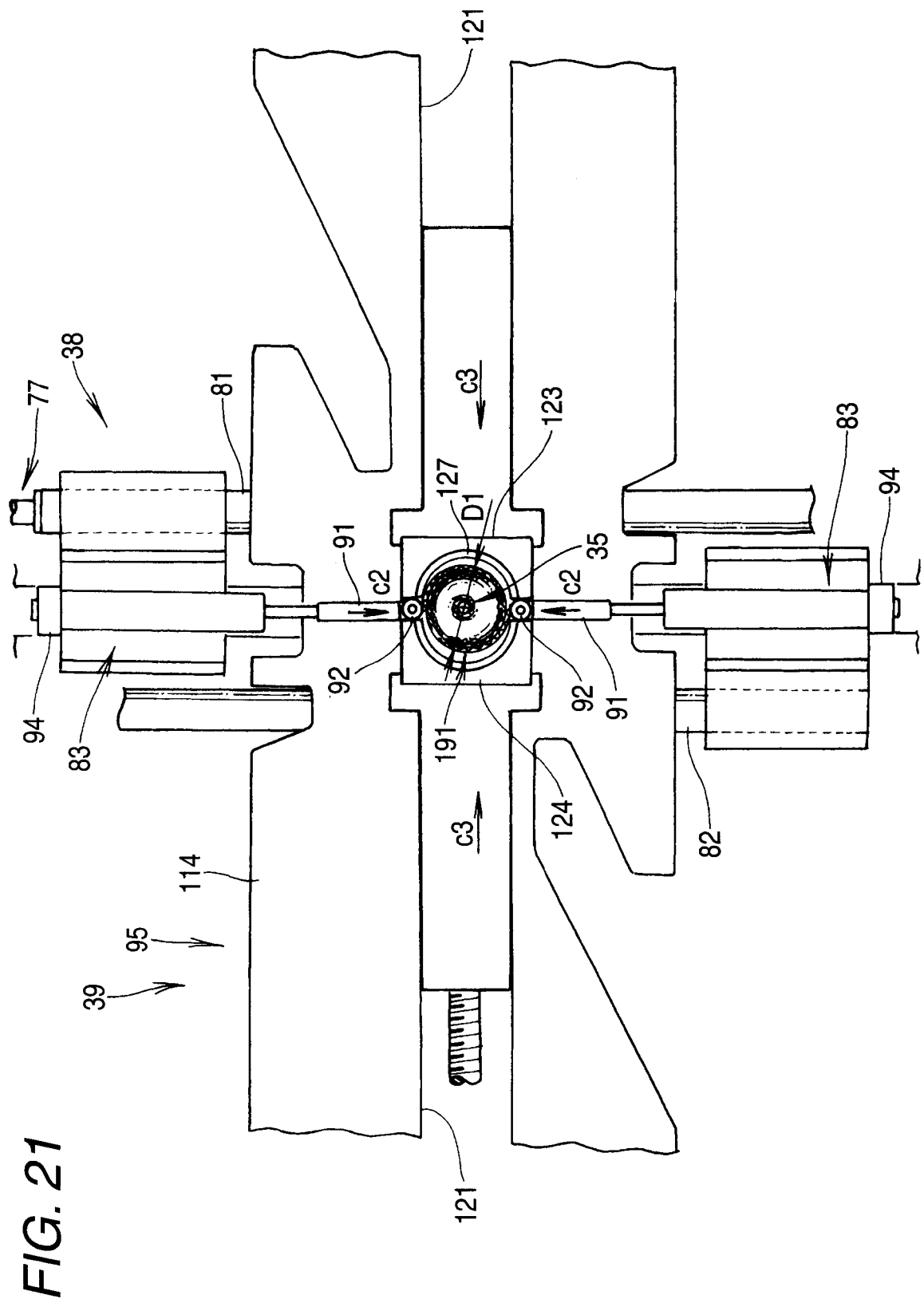
[FIG. 21] A first explanatory diagram illustrating a forming step which is executed in the metal honeycomb catalyzer carrier assembling method of the invention.

FIG. 21 is a first explanatory diagram of the forming step which is executed in the metal honeycomb catalyzer carrier assembling method of the invention.

In the fifth step of forming, the die unit 39 is caused to slide (in the direction indicated by the arrows c3, c3) so as to form (refer to FIG. 23) a wound structure (a primary wound structure) 191 into a cylindrical shape having a predetermined outside diameter at a site where the wound structure 191 results.

The outside diameter of the wound structure (the primary wound structure) 191 is made to be D1. The outside diameter D1 is a mean value, and D1>2×rm (refer to FIG. 12).

In the fifth step of forming, although the description has already been made, the press roller unit 38 continues to slide (in the direction indicated by the arrows c2, c2) so as to correspond to the remaining lengths of the corrugated belt plate materials 23 . . . and grips, when the winding rotational unit 35 finishes winding the corrugated belt plate materials 23 . . . , a resulting wound structure (a primary wound structure) 191 is held by the first movable die 123 and the second movable die 124. As this occurs, the first movable die 123 and the second movable die 124 stop once to leave slight gaps between the support plates 91, 91 and the roller main bodies 92, 92 of the press roller unit 38.

Figure 22:
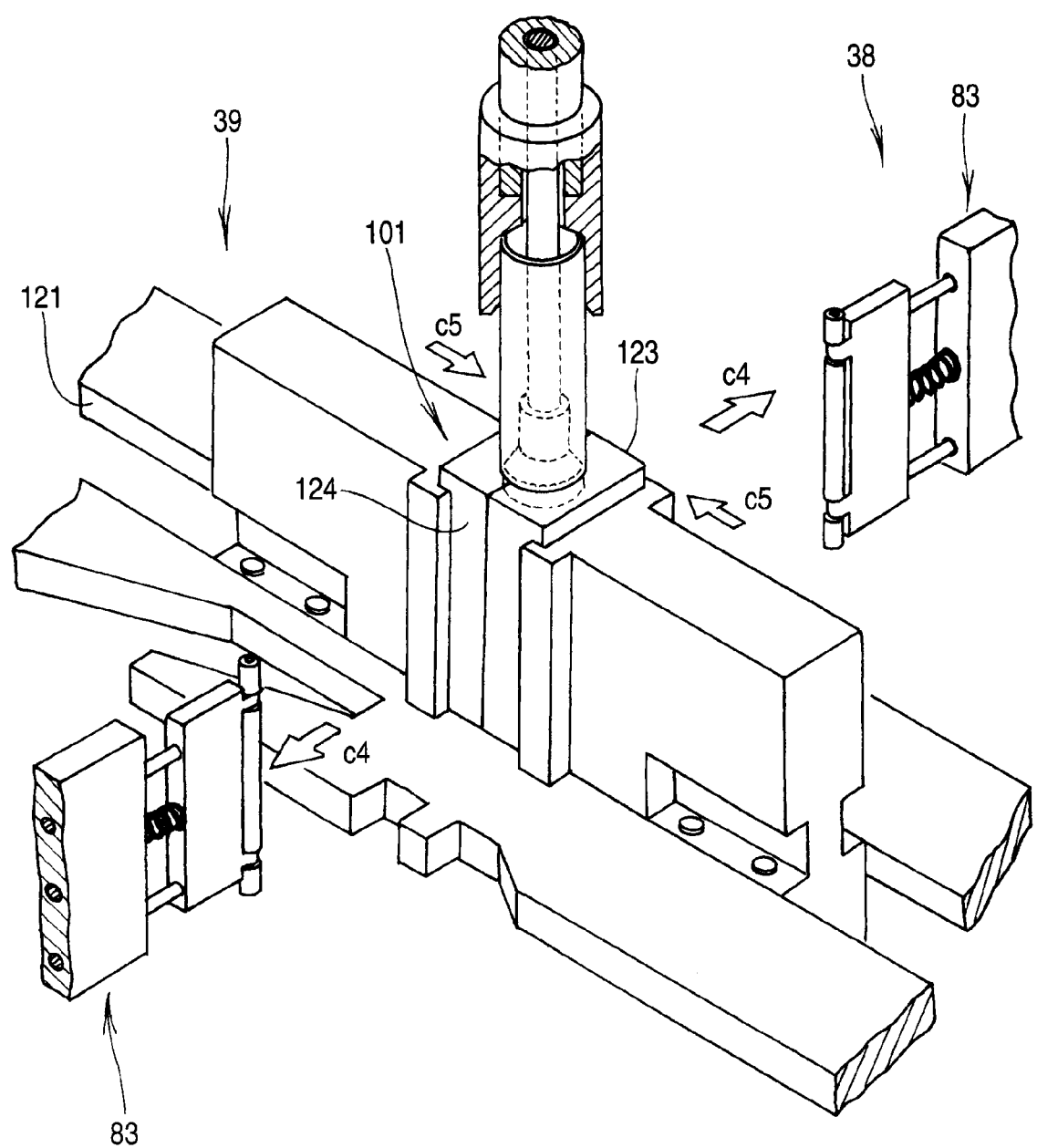
[FIG. 22] A second explanatory diagram illustrating the forming step which is executed in the metal honeycomb catalyzer carrier assembling method of the invention.

FIG. 22 is a second explanatory diagram of the step of forming which is executed in the metal honeycomb catalyzer carrier assembling method of the invention.

The damping unit 83 of the press roller unit 38 still continues to slide (in a direction indicated by arrows c4, c4) towards its origin point, and the first movable die 123 and the second movable die 124 travel forwards (in a direction indicated by arrows c5, c5) in a synchronized fashion momentarily the damping unit 83 is dislodged from the die 101, whereupon the die 101 is closed.

Figure 23A:
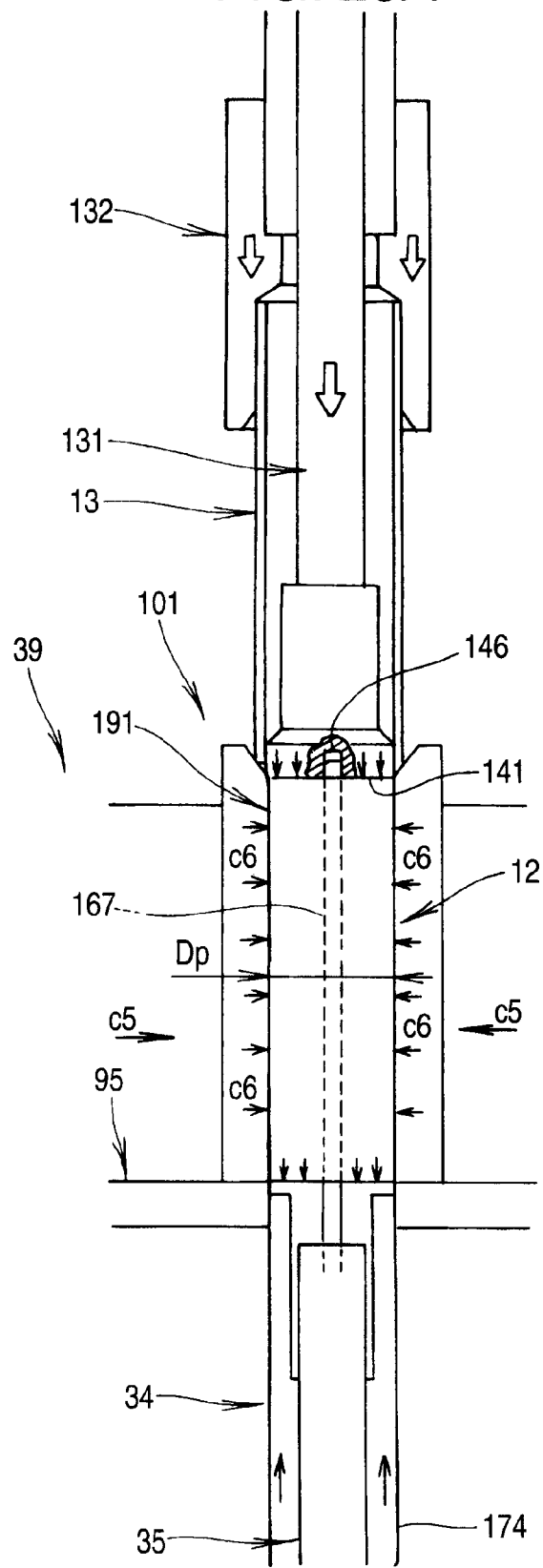
[FIG. 23A] An explanatory diagram illustrating the forming step to a step of inserting a wound honeycomb body into a tubular member which are executed in the assembling method of the invention.
Figure 23B:
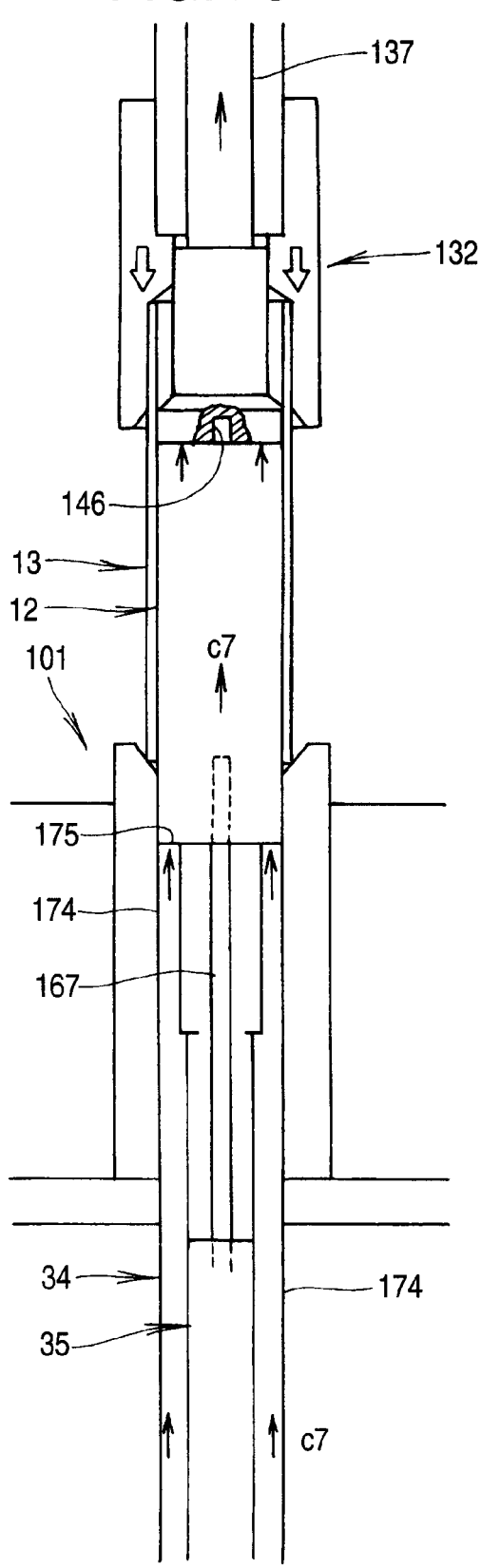
[FIG. 23B] An explanatory diagram illustrating the forming step to the step of inserting the wound honeycomb body into the tubular member which are executed in the assembling method of the invention.

FIGS. 23A, 23B are explanatory diagrams of the steps of forming to inserting a resulting honeycomb body into the tubular member. FIG. 23A shows the step of forming and FIG. 23B shows the step of inserting a resulting honeycomb body into the tubular member.

FIG. 23A: in the step of forming, a surface pressure is applied to the wound structure (the primary wound structure) 191 in a direction indicated by arrows c6 . . . by closing the die 101, whereby the wound structure (the primary wound structure) 191 is formed into the cylindrical shape of a predetermined outside diameter of Dp (Dp=2×rm) at the site where the primary wound structure 191 has resulted. As a result, a wound honeycomb body 12 is obtained.

Note that when used herein, the site means a state where the primary wound structure 191 is wound round the rotational holding shaft 167 and is held between the table 95 of the die unit 39 and the pressing portion 141 of the honeycomb presser unit 131.

Thus, in the step of forming, the die unit 39 can be caused to slide (in the direction indicated by the arrows c3, c3) so as to form the primary wound structure 191 into the cylindrical shape of the predetermined outside diameter of Dp (Dp=2×rm) at the site to thereby obtain the wound honeycomb body 12 of the predetermined outside diameter Dp, whereby the wound honeycomb body 12 can be inserted into the tubular member 13 without any interference therewith in the following step (the sixth step).

Following this, based on information that the die 101 has been closed, the honeycomb push-out and insertion unit 34 starts to operate and the sixth step of insertion is initiated.

FIG. 23B: In the sixth step of insertion, the wound honeycomb body 12 obtained by forming the primary wound structure 191 accordingly is pushed out so as to be inserted into the tubular member 13 connected to the die 101.

To be specific, when the electric motor 177 of the honeycomb push-out and insertion unit 34 shown in FIG. 15 is activated, the nut portion 181 of the screw mechanism 178 is raised (in the direction indicated by the arrow c7) along the sliding guide 171, whereby the hollow push shaft 174 inserts the wound honeycomb body 12 into the interior of the tubular member 13 using the die 101 as a guide at the same time as pushing out the wound honeycomb body 12 while rising (sliding).

As this occurs, since the push rod 137 rises at the same speed as a speed at which the hollow push shaft 174 rises, the wound honeycomb body 12 enters the interior of the tubular member 13 at the same time that the wound honeycomb body 12 is dislodged from the die 101.

Since the wound honeycomb body 12 that has entered the interior of the tubular member 13 springs back, whereby the diameter thereof becomes slightly larger than the outside diameter Dp to thereby press against an inner surface of the tubular member 13, a state results where the wound honeycomb body 12 so inserted into the tubular member 13 becomes integral with the tubular member 13.

Finally, the tubular member 13 in which the round honeycomb body 12 is fitted is removed from the assembling apparatus to complete one cycle of manufacturing. Subsequently, the second cycle is initiated as shown in FIG. 16. Note that welding is carried out using a different apparatus in a different process.

Thus, since the metal honeycomb catalyzer carrier assembling method is made up of the step of winding the belt plates (the corrugated belt plate materials) 23 into the substantially cylindrical shape, the step of forming the primary wound structure into the predetermined cylindrical shape by the die 101, and the step of pushing out the wound honeycomb body 12 resulting from the forming and inserting the wound honeycomb body 12 into the interior of the tubular member 13, there is no need to remount the wound honeycomb body 12 on, for example, an insertion device, and hence, the work is facilitated of inserting the wound honeycomb body 12 into the tubular member 13.

Thus, the metal honeycomb catalyzer carrier assembling apparatus 31 is made up of the winding unit 42 which includes the rotational holding shaft 167 and the press roller unit 38, the forming unit 39 for forming the primary wound structure 191 wound round the rotational holding shaft 167 into the wound honeycomb body 12 of the predetermined cylindrical shape (having the outside diameter Dp), the tube support unit 132 for setting the tubular member 13 to the positioning chamfered portion 127 formed at the edge of the die surface 126 and the honeycomb push-out and insertion unit 34 for pushing out (in the direction indicated by the arrow c7) the resulting structure (the wound honeycomb body) 12 from the die 101 and inserting the resulting structure 12 into the tubular member 13, the wound honeycomb body 12 can be obtained which is formed into the predetermined cylindrical shape at the site where the wound honeycomb body 12 results, and the wound honeycomb body 12 so obtained can be inserted into the tubular member 13 directly at the site. Consequently, too many labor hours are not necessary to insert the wound honeycomb body 12 into the tubular member 13.

Next, an assembling apparatus of another embodiment of the invention will be described.

Figure 24:
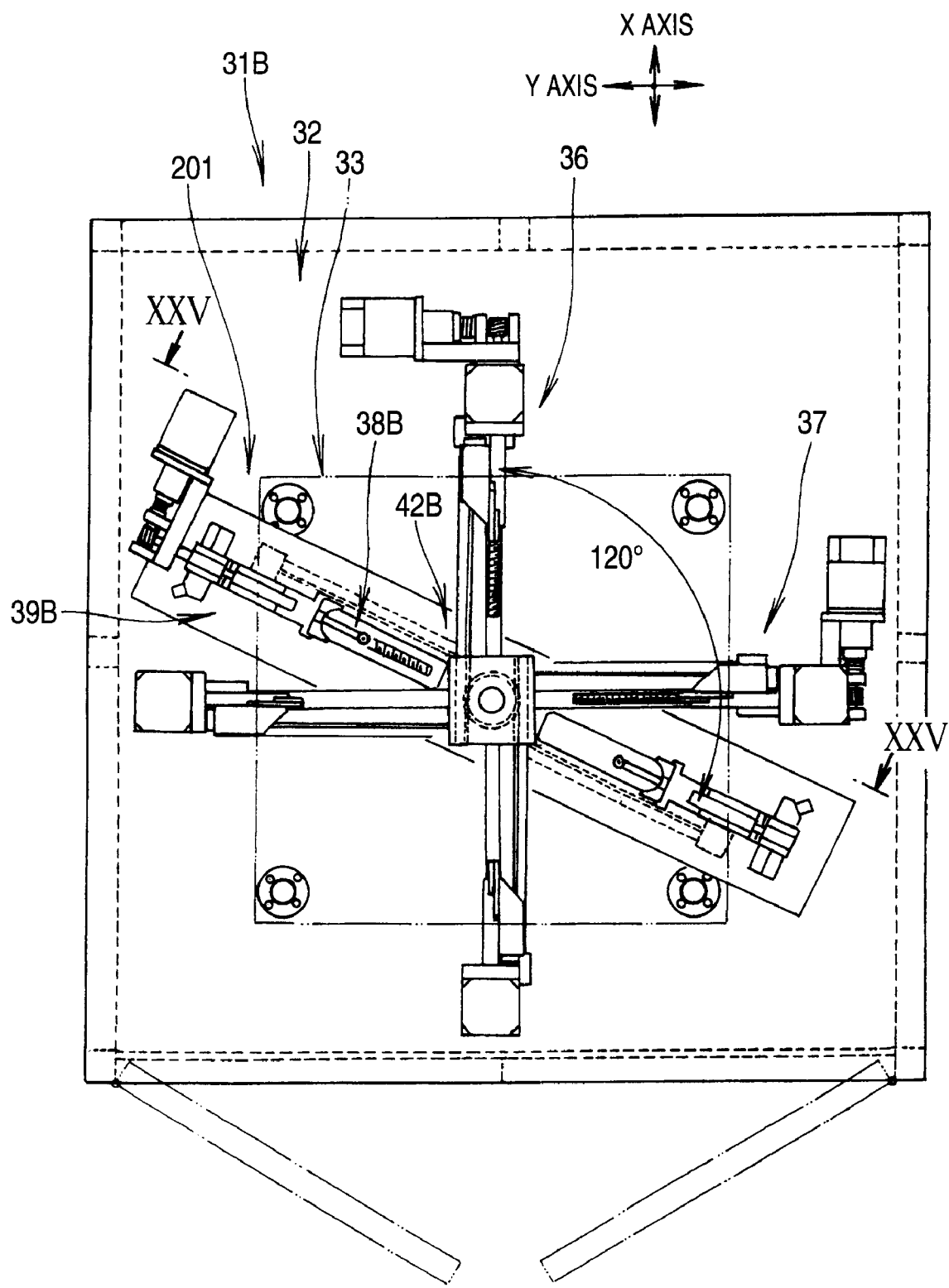
[FIG. 24] An explanatory diagram illustrating an assembling apparatus of another embodiment.

FIG. 24 is an explanatory diagram illustrating an assembling apparatus of another embodiment of the invention. Like reference numerals will be given to like constituent elements to those of the embodiment shown in FIGS. 1 to 13, and the description thereof will be omitted.

An assembling apparatus 31B of another embodiment is characterized in that the apparatus includes a roller mounted die mechanism 201, which is disposed at a position lying 120° apart from the X axis.

Specifically speaking, the assembling apparatus 31B includes a first-stage base 32, a second-stage base disposed on the first-stage base 32, a honeycomb push-out and insertion unit 34 (refer to FIG. 15) mounted on the first-stage base 32, a first bending unit 36, a second bending unit 37, a press roller unit 38B and a die unit 39B which are placed on the first-stage base 32, a work presser unit 41 placed on the second-stage base 33, a control unit (not shown), a control panel (not shown) and a pneumatic device (not shown).

Note that a winding unit 42B is made up of the press roller unit 38B and a winding rotational unit 35 disposed on the first-stage base 32.

Figure 25:
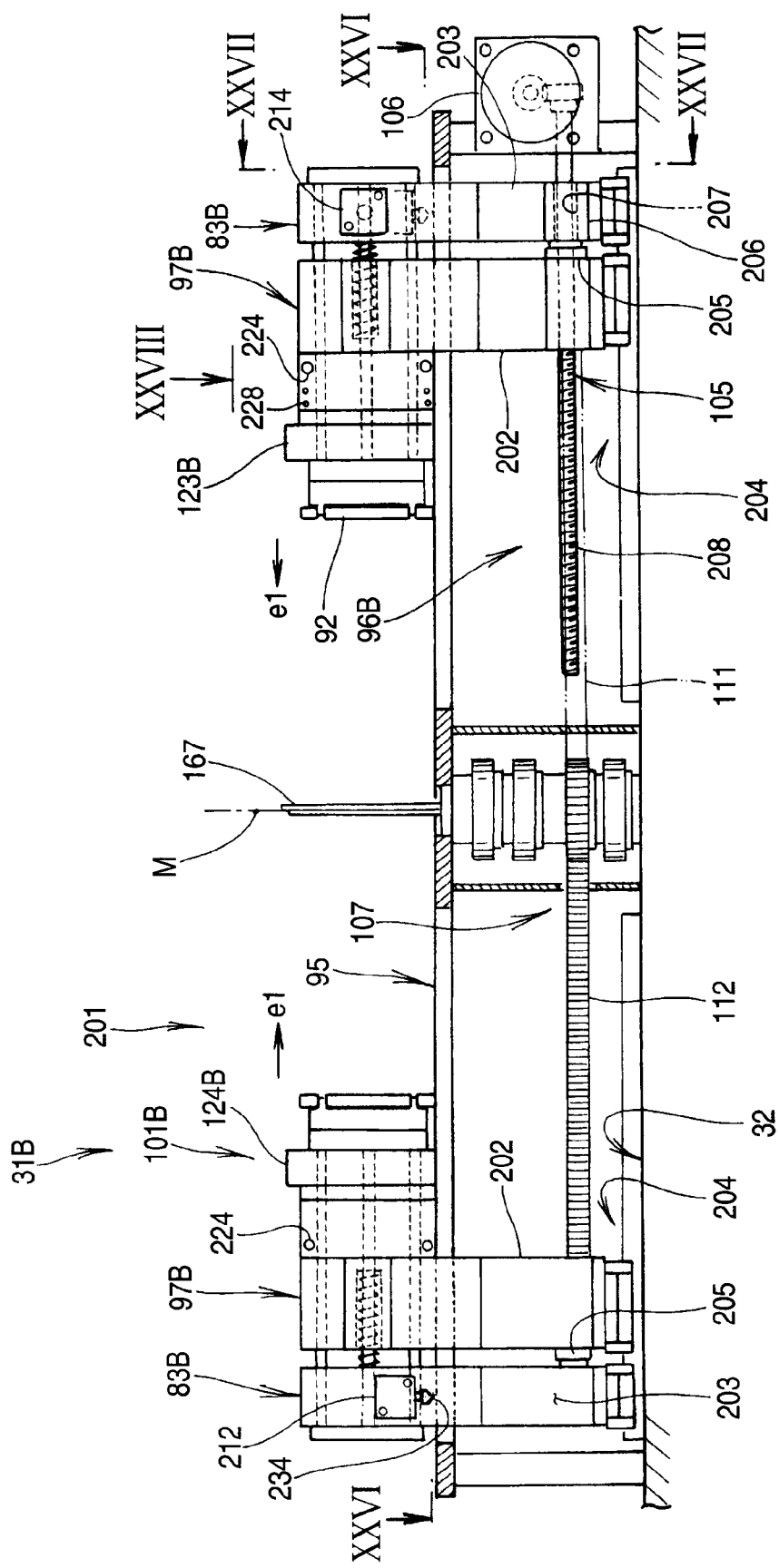
[FIG. 25] A view resulting when the assembling apparatus is seen in a direction indicated by arrows XXV in FIG. 24.

FIG. 25 is a view resulting when the assembling apparatus 31B is seen in a direction indicated by arrows XXV in FIG. 24 and shows the front of a roller mounted die mechanism 201 equipped on the assembling apparatus 31B of the other embodiment and a waiting state at an origin position thereof.

Figure 26:
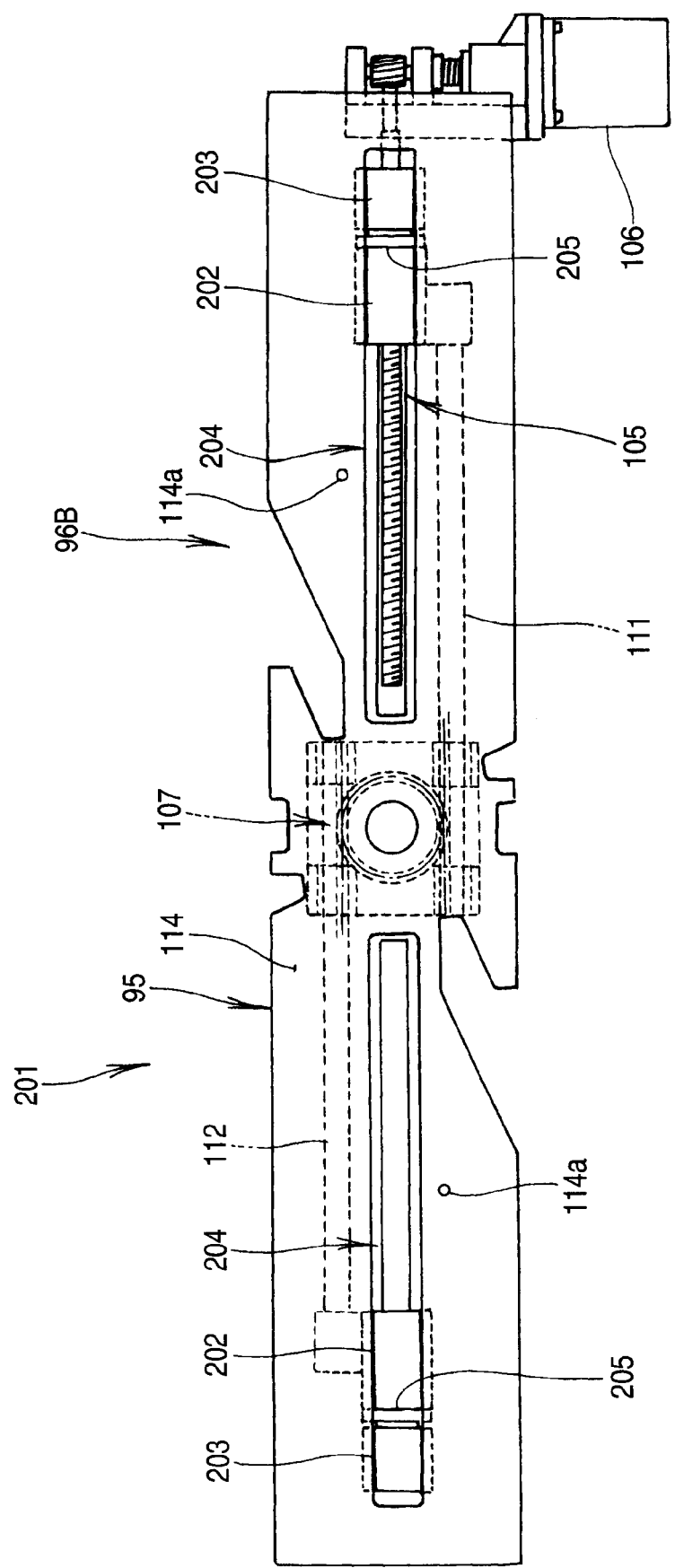
[FIG. 26] A view resulting when the assembling apparatus is seen in a direction indicated by arrows XXVI in FIG. 25.

FIG. 26 is a view resulting when the assembling apparatus 31B is seen in a direction indicated by arrows XXVI in FIG. 25 and shows a driving unit 96B of the roller mounted die mechanism 201.

Figure 27:
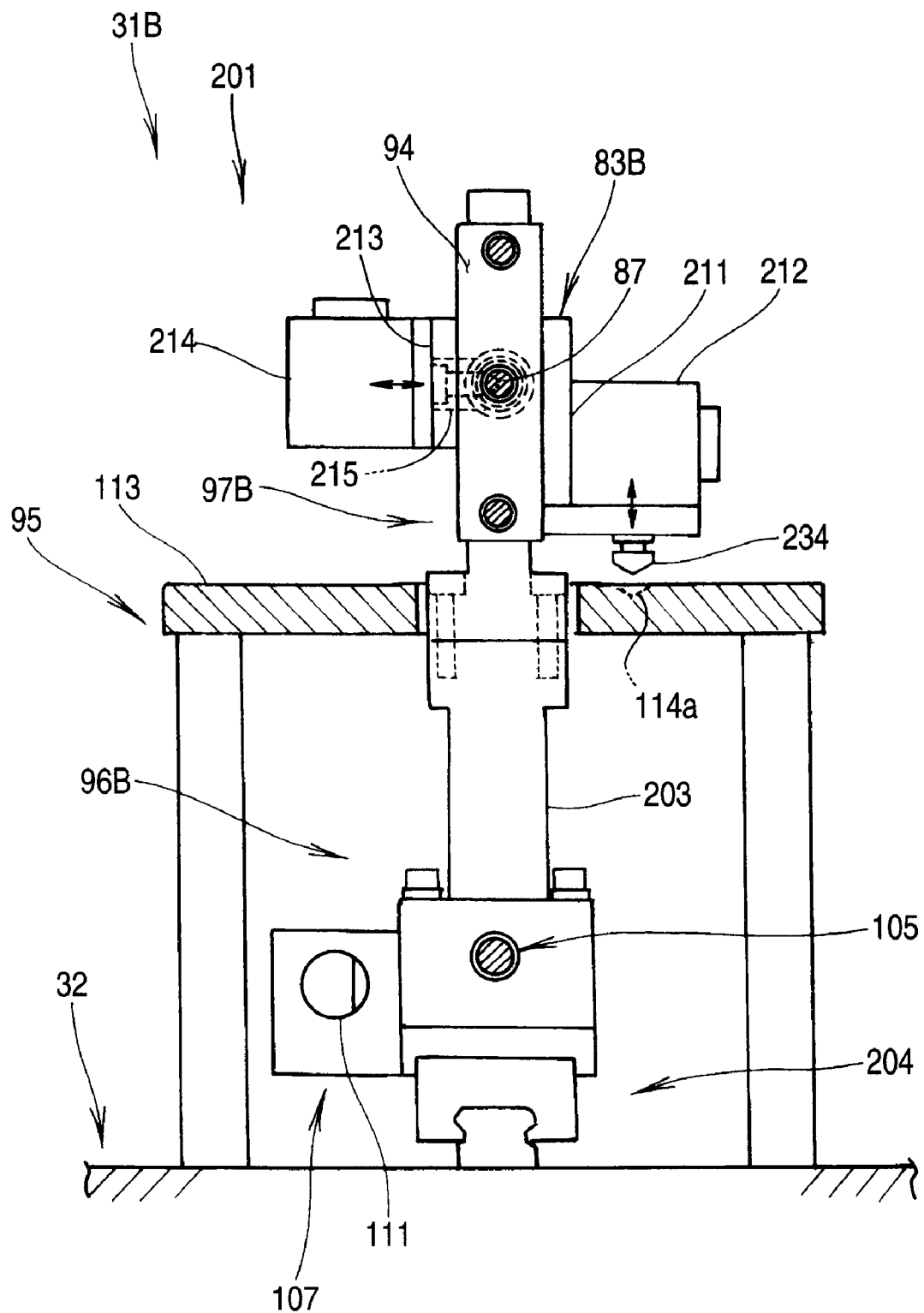
[FIG. 27] A view resulting when the assembling apparatus is seen in a direction indicated by arrows XXVII in FIG. 25.

FIG. 27 is a view resulting when the assembling apparatus 31B is seen in a direction indicated by arrows XXVII in FIG. 25 and shows a side of the roller mounted die mechanism 201.

In the roller mounted die mechanism 201, a long table 95 is mounted on the first-stage base 32, the driving unit 96B is disposed within the table 95, die mounting members 97B, 97B are mounted on the driving unit 96B, a first movable die 123B and a second movable die 124B of a die 101B are mounted on each of the die mounting members 97B, 97B, and damping units 83B, 83B are mounted on the driving unit 96B, whereby the damping units 83B, 83B and the die mounting members 97B, 97B are caused to slide (in a direction indicated by arrows e1, e1) in a synchronized state.

Fixing holes 114a, 114a are opened in a table main body 114 of the table 95.

The driving unit 96B is disposed within the table 95 and is such that sliding rails 204, 204 equipped with sliders 202, 202, 203, 203 are mounted on the first-stage base 32, a ball screw mechanism 105 is mounted on one (lying on a right-hand side of the figure) of the sliders 202, an electric motor 106 is coupled to the ball screw mechanism 105 and the electric motor 106 is fixed to a side of the table 95, a third synchronous unit 107 is disposed on the first-stage base 32, the ball screw mechanism 105 is connected to a first rack 111 of the third synchronous unit 107, the other (lying on a left-hand side of the figure) of the sliders 202 is connected to a second rack 112 of the third synchronous unit 107, and magnets 205, 205 are mounted on the sliders 202, 202, respectively.

The slider 203 (lying on the ball screw mechanism 105 side) is such that a relief hole 207 is opened in a main body 206 thereof in such a manner as to have a larger diameter than the outside diameter of an externally threaded portion 208 of the ball screw mechanism 105 and does not mesh with the externally threaded portion 208.

The magnet 205 is a permanent magnet, for example, and when the slider 203 is attracted to the magnet 205, both the sliders 202, 203 are coupled together.

Note that the slider 203 is attracted (connected) to the slider 202 by means of the magnet 205 in their waiting states at their origin positions.

Figure 28:
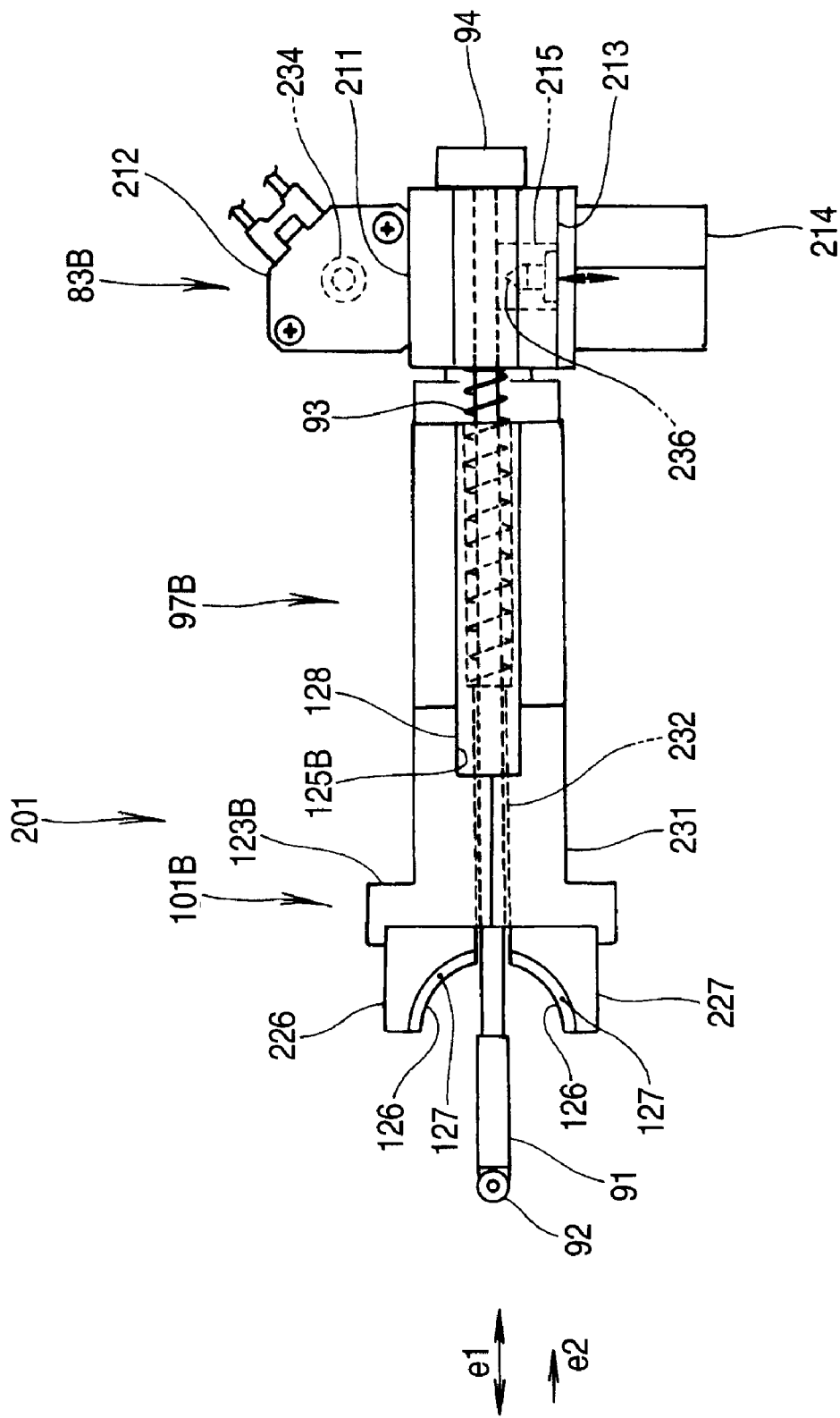
[FIG. 28] A view resulting when the assembling apparatus is seen in a direction indicated by arrows XXVIII in FIG. 25

FIG. 28 is a view resulting when the assembling apparatus 31B is seen in a direction indicated by an arrow XXVIII in FIG. 25 and shows plan views of the damping unit 83B and the die mounting member 97B which are provided on the roller mounted die mechanism 201.

Figure 29:
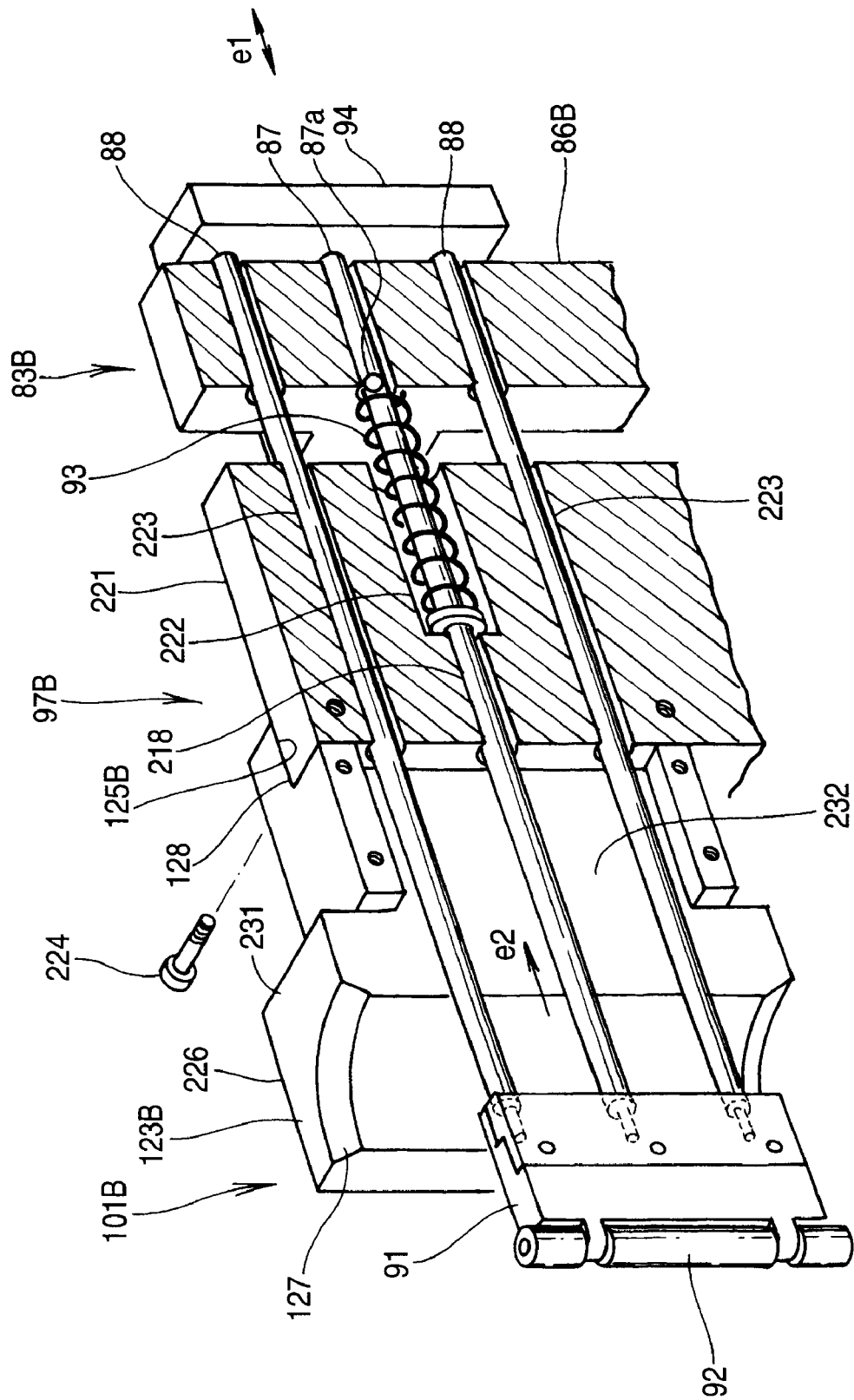
[FIG. 29] A sectional view showing a damping unit, a die mounting member and a die which are equipped on a roller mounted die mechanism of the other embodiment.

FIG. 29 is a sectional view showing sections of the damping unit, the die mounting member and the die which are provided on the roller mounted die mechanism of the other embodiment. The description will be made while referring to FIGS. 25 and 27, as well.

In the damping unit 83B, a base table 86B is mounted on the slider 203, a base table 86B is mounted on the slider 203, guide shafts 87, 88, 88 are fitted in the base table 86B in such a manner as to freely slide (in a direction indicated by an arrow e1), a support plate 91 is attached to distal ends of the guide shafts 87, 88, 88, a roller main body 92 is attached to the support plate 91 in such a manner as to freely rotate about the Z axis, a compression spring 93 is interposed between the die mounting member 97B and the base table 86B via the guide shaft 87, a stopper 94 is attached to the rear end of the guide shafts 87, 88, 88, a damping lock unit 212 is mounted on a first side 211 of the base table 86B, a shaft lock unit 214 is mounted on a second side 213 of the base table 86B, and a hole portion 215 is opened in the second side 213 in such a manner as to allow the shaft lock unit 214 to pass therethrough, whereby corrugated belt plate materials 23 ... (refer to FIG. 16) are pushed towards a rotational axis center M by the roller main body 92.

A positioning hole 87a is opened in the guide shaft 87.

In the die mounting member 97B, a hole 218 is opened in a main body 221 thereof which allows the guide shaft 87 to fit therein in such a manner as to freely slide (in the direction indicated by the arrow e1), a catching hole 222 is opened in the main body 221 concentrically with the hole 218 which catches therein the compression spring 93, holes 223, 223 are opened in the main body 221 in such a manner as to allow the guide shafts 88, 88 to fit therein slidably, and a raised portion 128 is formed on the main body 221 in such a manner that the die 101B is mounted thereat. Reference numeral 224 denotes a bolt with which the die 101B is mounted.

The die 101B is made up of the first movable die 123B and the second movable die 124B (refer to FIG. 25), and the first movable die 123B is divided into two dies, and half-divided dies 226, 227 (refer to FIG. 28) are integrated with each other (tightened from the half-divided die 227 side) with bolts 228 ... (FIG. 25).

The half-divided die 226 is such that a fastening recess portion 125B is formed at one end of a main body 231 thereof in such a manner as to fit on the raised portion 128, a die surface 126 is carved at the other end thereof, and a retraction hole 232 is formed through the die surface 126 and into a center of the main body 231 in such a manner as to allow the support plate 91 and the roller main body 92 to be accommodated further rearwards (in a direction indicated by an arrow e2) than the die surface 126 when they are retracted backwards (caused to slide in the direction indicated by the arrow e2).

The half-divided die 227 (refer to FIG. 28) is similar to the half-divided die 226.

The second movable die 142B (refer to FIG. 10) is similar to the first movable die 123B.

In the damping lock unit 212, a lock pin 234 (refer to FIG. 27) is mounted on a rod of a pneumatic cylinder, and the lock pin 234 is fitted in a fixing hole 114a in the table 95 (refer to FIGS. 26, 27), whereby the damping unit 83B (the base table 86B) is stopped at a certain position.

Next, the function of the assembling apparatus 31B of the other embodiment will be described below.

Firstly, as shown in FIGS. 16 to 18, after the corrugated belt plate materials 23 ... are bent at the central portions 26 by the first bending unit 36 and the second bending unit 37, the roller mounted die mechanism 201 starts its operation based on information that the second bending unit 37 has returned to its origin point and information from the control unit.

Figure 30:
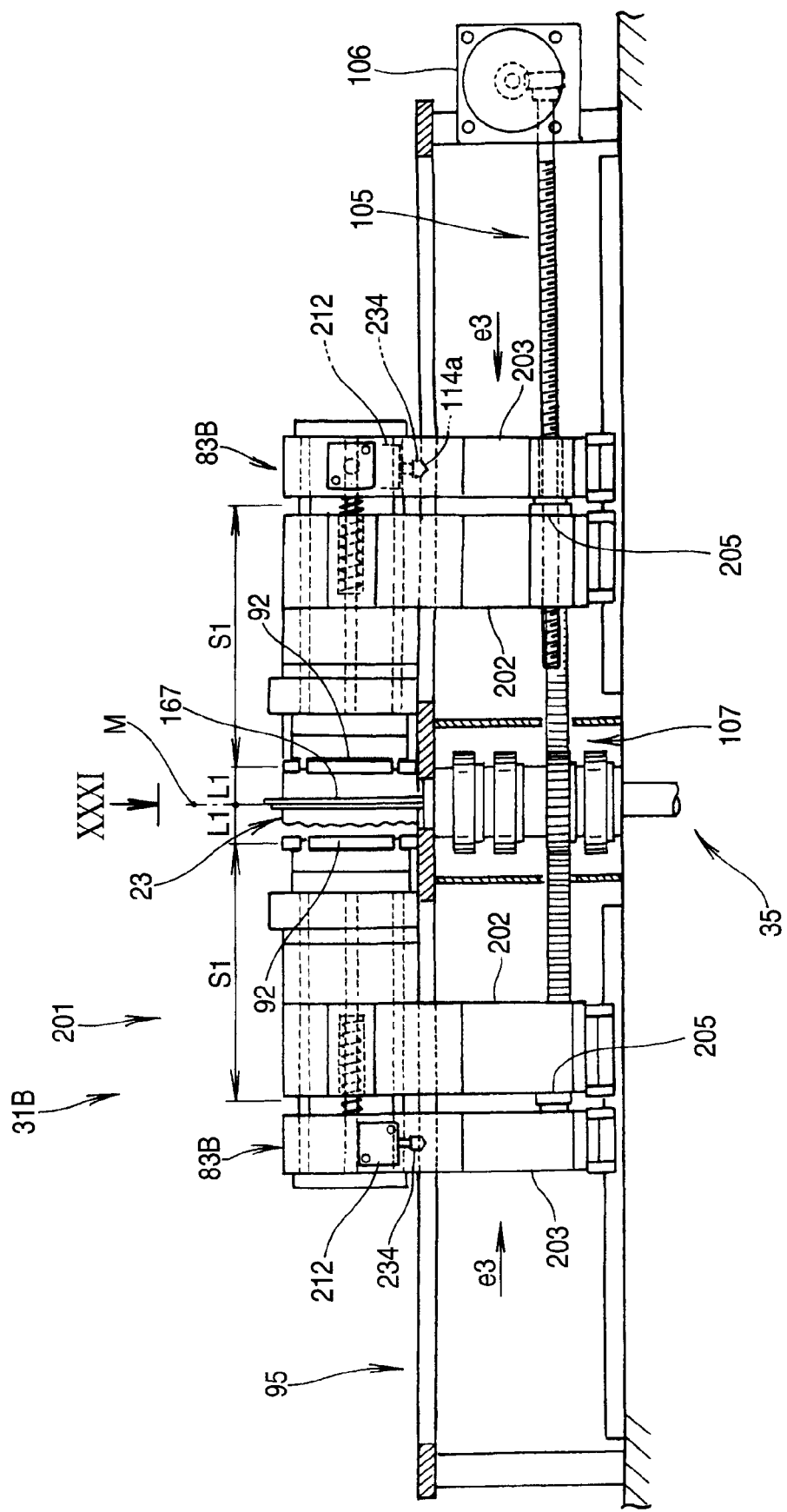
[FIG. 30] A first functional diagram of the roller mounted die mechanism equipped on the assembling apparatus of the other embodiment.

FIG. 30 is a first functional diagram of the roller mounted die mechanism equipped on the assembling apparatus of the other embodiment.

Figure 31:
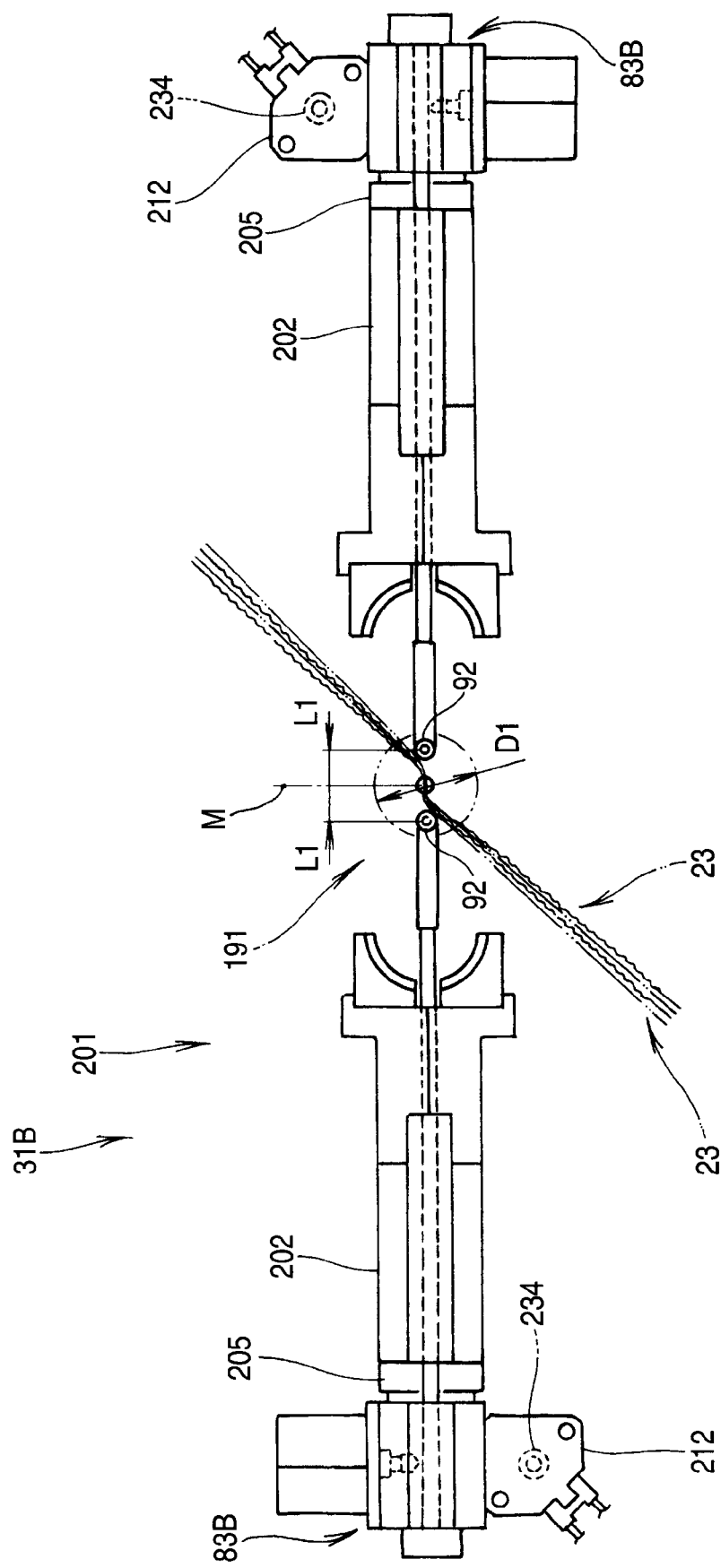
[FIG. 31] A view resulting when the assembling apparatus is seen in a direction indicated by an arrow XXXI in FIG. 30.

FIG. 31 is a view resulting when the assembling apparatus 31B is seen in a direction indicated by an arrow XXXI in FIG. 30 and shows an enlarged view thereof.

Firstly, the roller mounted die mechanism 201 causes the roller main bodies 92, 92 to slide (in a direction indicated by arrows e3, e3) to positions lying distances L1, L1 apart from the rotational axis center M. Following this, the roller main bodies 92, 92 are locked by the damping lock units 212.

The distance L1 is smaller than a radius r of the outside diameter D1 of a primary wound structure 191 which is indicated by a chain double-dashed line.

Specifically speaking, when the electric motor 106 is activated, whereby the sliders 202, 202 are caused to slide in a synchronized fashion by the ball screw mechanism 105 and the third synchronous unit 107, the sliders 203, 203, which are attracted and connected to the sliders 202, 202, respectively, by the magnets 205, 205, are also caused to slide together. When the sliders 202, 202 slide by a pre-set distance S1, the electric motors 106 are stopped based on predetermined information. Following this, the pneumatic device (not shown) is activated based on information that the electric motor 106 has stopped, and at the same time, the damping lock units 212, 212 fit the lock pins 234, 234 in the fixing holes 114a, 114a in the table 95 (refer to FIGS. 26, 27) so as to fix the damping units 83B integrally relative to the table 95.

Following the above, the rotational holding shaft 167 of the winding rotational unit 35 rotates about the Z axis so as to wind the corrugated belt plate materials 23 . . . . As this occurs, the roller main bodies 92, 92 control the rotation of the remaining portions of the corrugated belt plate materials 23 . . . from outside.

Figure 32:
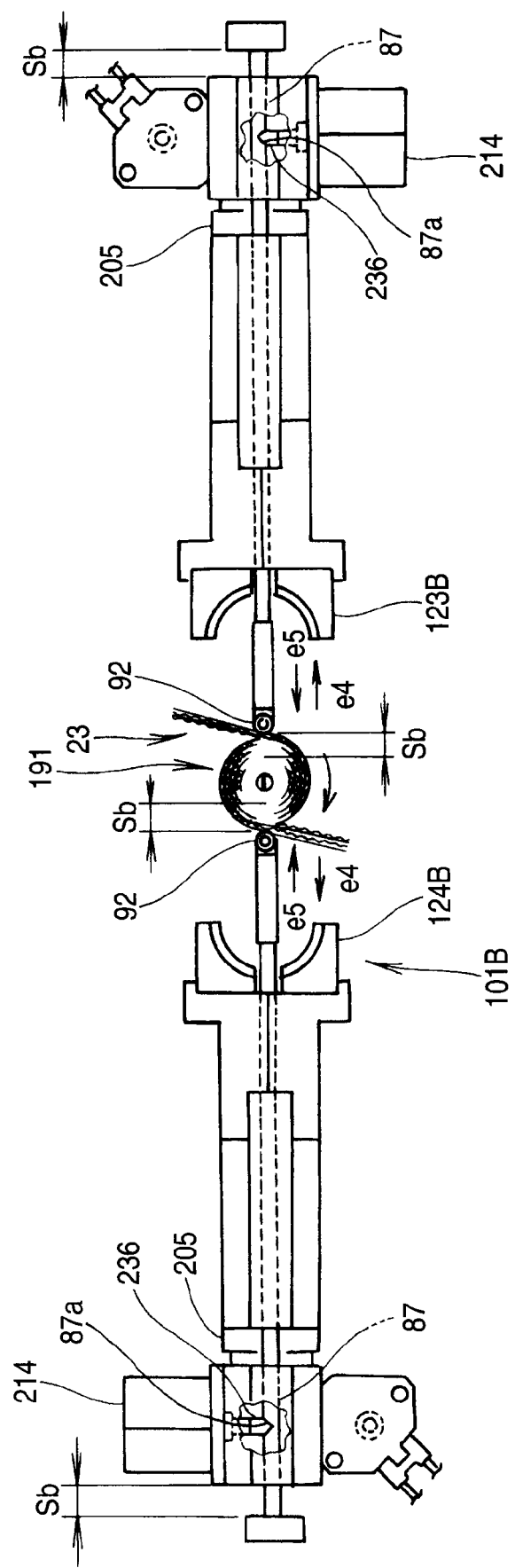
[FIG. 32] A second functional diagram of the roller mounted die mechanism of the other embodiment.

FIG. 32 is a second functional diagram of the roller mounted die mechanism of the other embodiment.

When the remaining portions of the corrugated belt plate materials 23 . . . are controlled by the roller main bodies 92, 92, the roller main bodies 92, 92 translate backwards as indicated by arrows e4 against the compression spring 93 (refer to FIG. 29) or forwards (in a direction indicated by arrows e5) according to the elastic force of the corrugated belt plate materials 23 . . . .

In addition, the roller main bodies 92, 92 translate backwards as indicated by the arrows e4 according to a resulting diameter of a wound structure against the compression spring (refer to FIG. 29), and when the outside diameter of the resulting wound structure 191 (a primary wound structure) has reached D1, the roller main bodies 92, 92 retract by as near as a distance Sb.

When the winding is completed, the pneumatic device and the shaft lock unit 214 are activated to thereby push a cam 236 into the positioning hole 87a in the guide shaft 87.

To describe in detail, at the point in time where the winding is completed, the center of the positioning hole 87a exists slightly forwards (in the direction indicated by the arrow e5) of the center of the cam 236, and when the cam 236 starts to enter the positioning hole 87a, the positioning hole 87a retracts (in the direction indicated by the arrow e4), and at the same time as this, the roller main body 92 also retracts and the retraction of the roller main body 92 stops where the center of the positioning hole 87a retracts to the center of the cam 236, and as a result, the roller main body 92 retracts slightly (smaller than a gap Ss in FIG. 33) further backwards (in the direction of an arrow e4) than a position where the winding has been finished and is then fixed integrally where the roller main body 92 retracts by the distance Sb.

Following this, the die 101B is closed.

Figure 33:
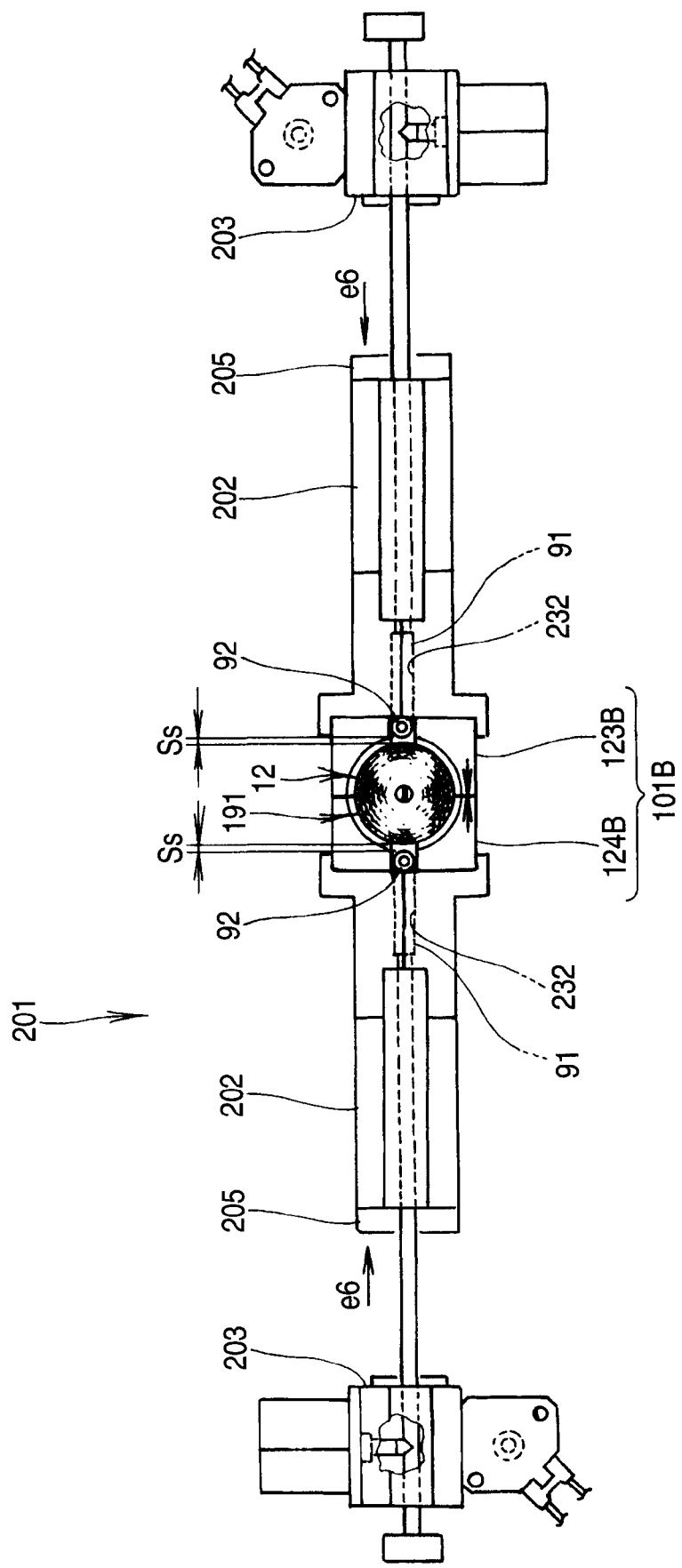
[FIG. 33] A third functional diagram of the roller mounted die mechanism of the other embodiment.
Figure 34:
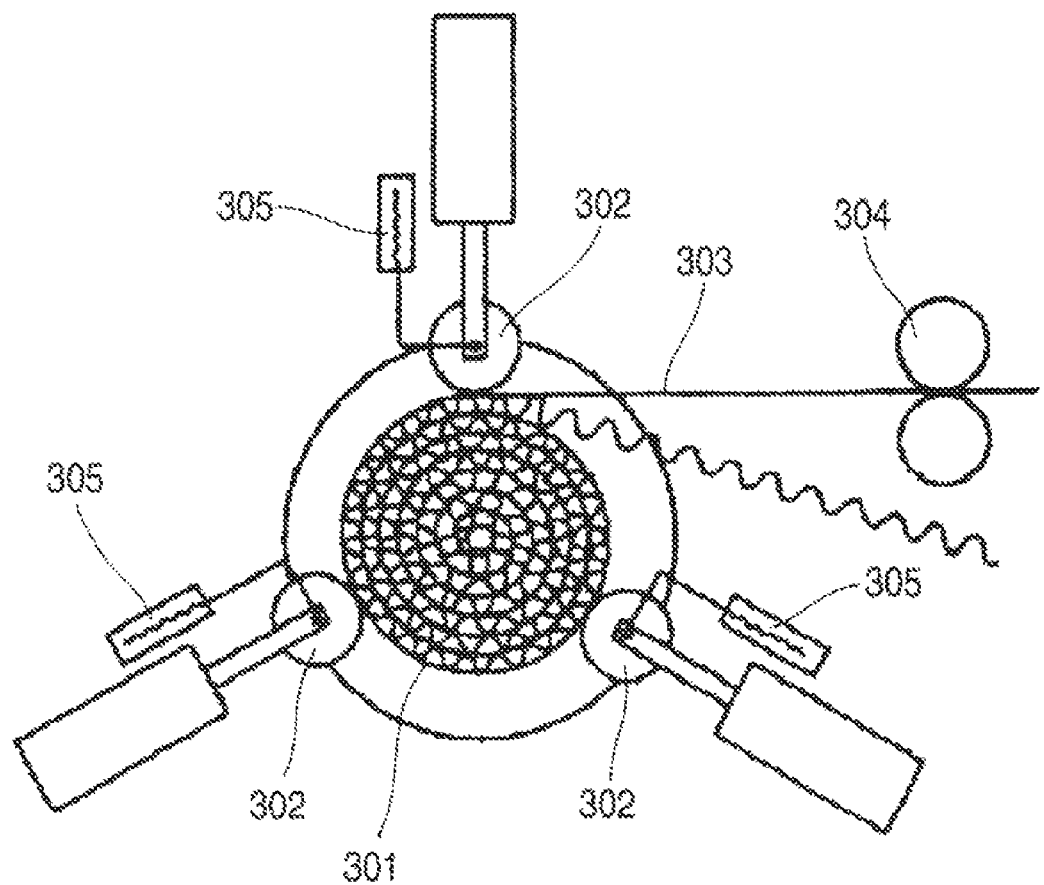
[FIG. 34] An explanatory diagram illustrating a conventional technique (Patent Document No. 1).
Figure 35A:
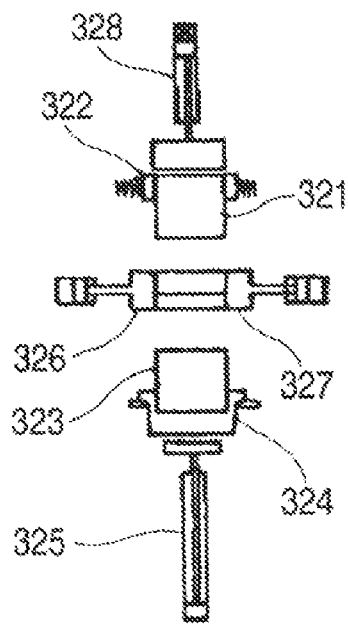
[FIG. 35A] An explanatory diagram illustrating a conventional technique (Patent Document No. 2).
Figure 35B:
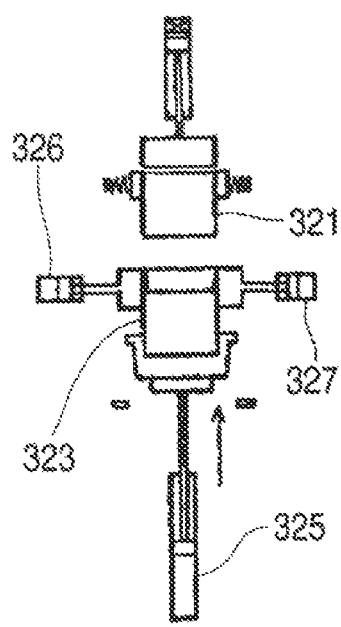
[FIG. 35B] An explanatory diagram illustrating the conventional technique (Patent Document No. 2).
Figure 35C:
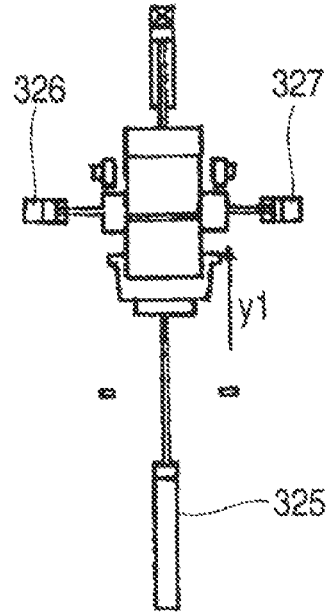
[FIG. 35C] An explanatory diagram illustrating the conventional technique (Patent Document No. 2).
Figure 35D:
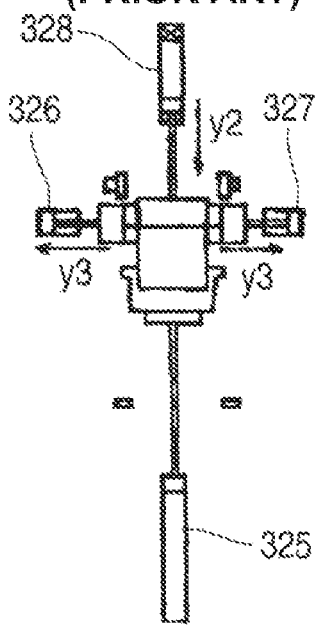
[FIG. 35D] An explanatory diagram illustrating the conventional technique (Patent Document No. 2).
Figure 35E:
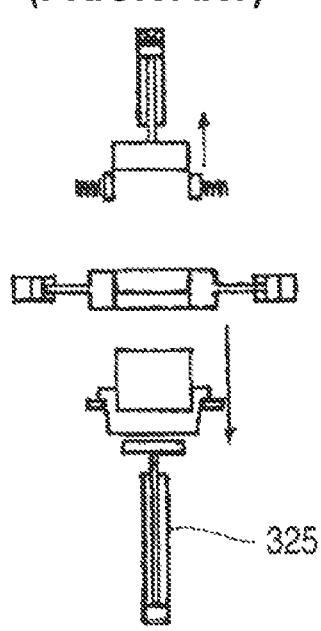
[FIG. 35E] An explanatory diagram illustrating the conventional technique (Patent Document No. 2).

FIG. 33 is a third functional diagram of the roller mounted die mechanism of the other embodiment. The description will continue while referring to FIG. 25, as well.

When the electric motor 106 and the ball screw mechanism 105 of the roller mounted die mechanism 201 are activated with the roller main bodies 92 are fixed at their retracted positions, both the sliders 202, 202 travel forwards (in a direction indicated by arrows e6, e6) in a synchronized fashion against the magnets 205, 205 while being separated from and leaving therebehind the sliders 203, 203, so that the first movable die 123B and the second movable die 124B are caused to travel forwards so as to allow the first movable die 123B and the second movable die 124B to be firmly secured to each other while causing the support plates 91 and the roller main bodies 92 to be accommodated into the retraction portions 232, 232 formed in the die 101B, and at the same time as this occurring, a pressure is applied to the primary wound structure 191 via the sliders 203, 203. By applying the surface pressure to the primary wound structure 191 as indicated by the arrows c6 (refer to FIG. 23), a wound honeycomb body 12 which has been formed into a cylindrical shape of a predetermined outside diameter Dp (Dp=2×rm) is completed within the die 101B at the site.

Since the roller main body 92 is fixed at the position which is slightly further backwards (in the direction indicated by the arrow e4 in FIG. 32) than the position where the winding was completed when the die 101B is closed, the roller main body 92 is accommodated further rearwards than the die surface 126, whereby a gap Ss is formed between an outer circumferential surface of the wound honeycomb body 12 and an outer circumferential surface of the roller main body 92.

Following the above, the wound honeycomb body 12 is inserted (refer to FIG. 23) into the tubular member 13 by the honeycomb push-out and insertion unit 34 (refer to FIG. 23) using the die 101B as a guide. As this occurs, a hollow push shaft 174 (refer to FIG. 23) does not interfere with the roller main bodies 92, 92 due to the gaps Ss, Ss which are formed between the outer circumferential surface of the wound honeycomb body 12 ad the outer circumferential surfaces of the roller main bodies 92, 92.

Thus, since the assembling apparatus 31B of the other embodiment includes the roller mounted die mechanism 201, the press roller unit 38 (refer to FIG. 8) does not have to be disposed, and hence, for example, the second synchronous unit 78 (refer to FIG. 8) is eliminated, simplifying the construction of the metal honeycomb catalyzer carrier assembling apparatus 31B.

In addition, since the assembling apparatus 31B of the other embodiment includes the roller mounted die mechanism 201, the press roller unit 38 (refer to FIG. 8) does not have to be disposed, and hence, the construction on the first-stage base 32 can be made smaller in size.

In addition, while in the embodiments, the metal honeycomb catalyzer carrier assembling method and apparatus of the invention are described as being applied to the honeycomb body which holds catalysts, the invention can be applied to honeycomb bodies which are used to hold other substances than catalysts.

While the invention has been described in detail and by reference to the preferred embodiments, it is obvious to those skilled in the art that various alterations and modifications can be made to the invention without departing from the spirit and scope of the invention.

This patent application is based on the Japanese Patent Application (No. 2005-181235) filed on Jun. 21, 2005 and the Japanese Patent Application (No. 2005-181256) filed on Jun. 21, 2005, and the contents thereof are incorporated herein by reference.

Industrial Applicability the metal honeycomb catalyzer carrier assembling method and apparatus of the invention are preferably applied to a honeycomb construction which holds catalysts for use in cleaning exhaust gases.

The invention claimed is:

1. An assembling method for a metal honeycomb-shaped catalyzer carrier comprising a honeycomb body comprising a belt plate having a corrugated portion provided in at least part thereof in a longitudinal direction; and a longitudinal central portion, the method comprising the steps of:

holding the central portion of the belt plate in a widthways direction of the belt plate by a holding member;

after holding the central portion of the belt plate, bending the belt plate by linearly displacing a first bending die toward and into contact with the belt plate so as to press the belt plate into abutment with the holding member to cause the belt plate to bend about the holding member, wherein the first bending die is linearly displaced from a first position where a distal end of the first bending die is disposed on a first side relative to a rotational center of the holding member, to a second position where the distal end of the first bending die is disposed on a second side relative to the rotational center of the holding member, said second side being opposite to said first side;

after bending the belt plate by making the belt plate abut the holding member, rotating the holding member about its rotational center so as to wind the belt plate; and pressing the wound belt plate towards the rotational center of the holding member from outside so as to form the wound belt plate into a substantially cylindrical shape.

2. The method according to claim 1, wherein pressing the wound belt plate towards the rotational center of the holding member is carried out simultaneously with rotating the holding member about its rotational center.

3. The method according to claim 1, wherein holding the belt plate includes holding the central portion of the belt plate by the holding member at a single lengthways point of the belt plate, and bending the belt plate includes linearly displacing the first bending die in a direction perpendicular to a direction of extension of the belt plate such that the first bending die is moved toward and into contact with the belt plate.

4. The method according to claim 1, wherein holding the belt plate includes holding the central portion of the belt plate by the holding member at a single lengthways point of the belt plate such that the holding member is disposed between a fist belt plate portion and a second belt plate portion, and bending the belt plate includes linearly displacing the first bending die toward and into contact with only the first belt plate portion to make first belt plate portion bend about the holding member, and further includes linearly displacing a second bending die toward and into contact with only the second belt plate portion to make the second belt plate portion bend about the holding member.

5. The method according to claim 4, wherein bending the belt plate includes linearly displacing the second bending die from a first position where a distal end of the second bending die is disposed on the second side relative to the rotational center of the holding member, to a second position where the distal end of the second bending die is disposed on the first side relative to the rotational center of the holding member, and wherein the first and second bending dies are linearly displaced from respective first positions to respective second positions in opposite directions of displacement to bend the belt plate.

6. The method according to claim 5, wherein the directions of displacement of the first and second bending dies are perpendicular to a direction of extension of the belt plate.

7. An apparatus for assembling a metal honeycomb catalyzer carrier having a honeycomb body comprising a belt plate having a corrugated portion provided in at least part thereof in a longitudinal direction; and a longitudinal central portion, the apparatus comprising:

a rotational holding shaft provided to be rotatable about a rotational axis, disposed to have the rotational axis be parallel to a widthways direction of the belt plate, and configured to hold the central portion of the belt plate;

a first bending unit comprising a first rectilinear bending die disposed parallel to the rotational axis of the rotational holding shaft, the first bending die being linearly movable toward the rotational holding shaft from a first position where a distal end of the bending die is disposed on a first side relative to the rotational axis of the rotational holding shaft to a second position where the distal end of the bending die is disposed on a second side relative to the rotational axis of the rotational holding shaft, said second side being opposite to said first side, such that the first bending die contacts and bends an unwound belt plate at a position where the rotational holding shaft which supports the belt plate is situated; and a press roller configured to cause the belt plate to approach the rotational holding shaft to a predetermined position and to press the belt plate being wound from outside towards the rotational axis.

8. The apparatus according to claim 7, further comprising a base, wherein the rotational holding member, the first bending unit, and the press roller are secured to the base.

9. The apparatus according to claim 7, wherein the rotational holding shaft is configured to hold the belt plate at a single lengthways point of the belt plate such that the rotational holding shaft is disposed between a first belt plate portion and a second belt plate portion, and the first bending die is linearly movable from the first position to the second position such that the first bending die contacts only the first belt plate portion.

10. The apparatus according to claim 7, further comprising a second bending unit comprising a second bending die, said second bending unit and second bending die being diametrically opposed to the first bending unit and first bending die such that the first bending die and the second bending die are linearly movable in opposite directions towards each other, said second bending die linearly movable from a first position where a distal end is disposed on the second side of the rotational axis of the rotational holding shaft, to a second position where the distal end is disposed on the first side of the rotational axis of the rotational holding shaft.

11. The apparatus according to claim 10, wherein the rotational holding shaft is configured to hold the belt plate at a single lengthways point of the belt plate such that the rotational holding shaft is disposed between a first belt plate portion and a second belt plate portion, and the first bending die is linearly movable from the first position to the second positions such that the first bending die contacts only the first belt plate portion, and the second bending die is linearly movable from the first position to the second position such that the second bending die contacts only the second belt plate portion.

* * * * *